US008400619B1

(12) United States Patent
Bachrach et al.

(10) Patent No.: US 8,400,619 B1
(45) Date of Patent: Mar. 19, 2013

(54) SYSTEMS AND METHODS FOR AUTOMATIC TARGET TRACKING AND BEAM STEERING

(75) Inventors: Benjamin Bachrach, Bethesda, MD (US); Sung Jung, Vienna, VA (US); Pan Gao, Rockville, MD (US); Yubing Yang, Rockville, MD (US)

(73) Assignee: Intelligent Automation, Inc., Rockville, MD (US)

( * ) Notice: Subject to any disclaimer, the term of this patent is extended or adjusted under 35 U.S.C. 154(b) by 190 days.

(21) Appl. No.: 12/545,117

(22) Filed: Aug. 21, 2009

Related U.S. Application Data

(60) Provisional application No. 61/091,193, filed on Aug. 22, 2008.

(51) Int. Cl.
*G01C 3/00* (2006.01)
(52) U.S. Cl. ........................................ 356/4.01; 356/4.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| 5,440,392 | A  | * | 8/1995  | Pettersen et al. ............. 356/620 |
|-----------|----|---|---------|---------------------------------------|
| 5,686,690 | A  |   | 11/1997 | Lougheed et al.                       |
| 6,031,606 | A  |   | 2/2000  | Bayer et al.                          |
| 6,145,784 | A  |   | 11/2000 | Livingston                            |
| 6,265,704 | B1 | * | 7/2001  | Livingston ................. 250/203.2 |
| 6,618,178 | B2 | * | 9/2003  | Engelhardt ................ 359/201.1  |
| 6,973,865 | B1 |   | 12/2005 | Duselis et al.                        |
| 7,022,971 | B2 | * | 4/2006  | Ura et al. ...................... 250/221 |
| 7,177,447 | B2 | * | 2/2007  | Olson et al. .................... 382/103 |
| 7,298,869 | B1 | * | 11/2007 | Abernathy .................... 382/108 |
| 7,929,150 | B1 | * | 4/2011  | Schweiger .................... 356/508 |
| 2001/0037998 | A1 | * | 11/2001 | Nicholas et al. ......... 219/121.69 |
| 2005/0099637 | A1 | * | 5/2005  | Kacyra et al. ................. 356/601 |
| 2006/0188169 | A1 |   | 8/2006  | Tener et al.                          |
| 2008/0174762 | A1 | * | 7/2008  | Liu et al. ...................... 356/5.09 |
| 2009/0147994 | A1 | * | 6/2009  | Gupta et al. .................. 382/103 |
| 2009/0260511 | A1 | * | 10/2009 | Melnychuk et al. ........... 89/1.11 |
| 2010/0283988 | A1 | * | 11/2010 | Mosier et al. ................. 356/4.01 |
| 2010/0328644 | A1 | * | 12/2010 | Lu et al. ...................... 356/5.01 |

OTHER PUBLICATIONS

Gandhi, Tarak; Trivedi, Mohan. Parametric Ego-Motion Estimation for Vehicle Surround Analysis Using aon Omnidirectional Camera. Machine Vision and Applications, vol. 16, pp. 85-95, 2005.*

* cited by examiner

*Primary Examiner* — Luke Ratcliffe
(74) *Attorney, Agent, or Firm* — Faegre Baker Daniels LLP

(57) ABSTRACT

An automatic target tracking system and method employ an image capturing system for acquiring a series of images in real time of a distant area containing a remote target, and a processing system for processing the acquired images to identify the target and follow its position across the series of images. An automatic beam steering and method operate in conjunction with a laser source for emitting a laser beam to be transmitted in the form of a transmitted laser beam extending along a steerable beam transmission axis to the remote target. The beam steering system is controlled by the processing system to steer the beam transmission axis to be aimed at the target being tracked by the target tracking system, so that the transmitted laser beam will be transmitted at the appropriate angle and in the appropriate direction to be aimed at the tracked target.

19 Claims, 14 Drawing Sheets

SYSTEMS AND METHODS FOR AUTOMATIC TARGET TRACKING AND BEAM STEERING

CROSS-REFERENCE TO RELATED PATENT APPLICATION

This application claims priority from prior U.S. provisional patent application Ser. No. 61/091,193 filed Aug. 22, 2008, the entire disclosure of which is incorporated herein by reference.

BACKGROUND OF THE INVENTION

1. Field of the Invention

The present invention pertains generally to systems and methods for target tracking and beam steering. More particularly, the present invention pertains to systems and methods for automatic target tracking and beam steering wherein a series of video images obtained of a distant area containing a target are processed to automatically track the target, and the transmission path for a laser beam to be transmitted from a laser range finder is automatically steered or reconfigured so that the laser beam is steered to be aimed at the tracked target.

2. Brief Discussion of the Related Art

Laser range finders are available that transmit laser beams for being directed at a remote target in order to determine the distance or range to the remote target. Depending on the circumstances, the remote target may be located a considerable distance from the range finder. Laser range finders are conventionally designed to transmit the laser beam therefrom along a fixed transmission path. Laser range finders generally operate on the "time of flight" principle by measuring the time taken for the laser beam to travel to the target and be reflected back to the range finder. With the speed of the laser light being a known value, and with an accurate measurement of the time taken for the laser light to travel to the target and back to the range finder, the range finder is able to calculate the distance from the range finder to the target. Accurate range acquisition requires that the laser beam transmitted from the range finder be accurately focused, aimed or pointed at the intended target, which normally involves having the transmitted laser beam centered on the target as accurately as possible. Because the transmission path for the laser beam is fixed in conventional range finders, it must be manually aimed at the target by moving the range finder prior to actuating the range finder to transmit the laser beam for range acquisition.

One area in which laser range finders are useful is the area of weapons or firearms, where the range finders can be used to determine the distances to remote targets intended to be neutralized or destroyed using ammunition fired or discharged from the weapons or firearms. Acquiring an accurate range to the intended remote target is important to ensure that ammunition fired at the target will reach the target and/or will detonate at an optimal location for the target to receive the maximum effect from the ammunition. Modern technology has made it possible to produce infantry weapons including relatively small, hand-held firearms capable of delivering air bursting ammunition, such as air bursting grenades, shells and bullets, over considerable distances or ranges. Air bursting ammunition is of the type that is capable of detonating or exploding in the air, without requiring impact. Air bursting weapons will be equipped with sophisticated target acquisition/fire control systems that allow the weapon to be programmed so that the ammunition detonates at a detonation point located a particular distance from the weapon. In order for the weapon to be programmed with the detonation point needed to ensure that the maximum effect of the ammunition is delivered to a particular intended remote target, the operator or soldier must first acquire an accurate range to that target. A laser range finder integrated with the target acquisition/fire control system will allow the operator to acquire the range to the intended target for use in programming the detonation point. It is important that the acquired range be accurate, and that the range be acquired to the actual intended target and not to some non-targeted object or location, to ensure that the programmed detonation point is also accurate. The accuracy of the programmed detonation point is particularly important where the ammunition is primarily lethal in a lateral direction upon detonation. If the ammunition detonates too far in front of or behind the target, for example, the effects of the ammunition may miss the target and therefore the target may not be neutralized or destroyed. However, as explained further below, various circumstances and conditions can make accurate range acquisition difficult to accomplish. Accurate range acquisition may be especially difficult to accomplish under the conditions and time constraints imposed in military situations where weapons are used and in other similar situations.

Laser range finders are typically used in association with scopes or telescopic sights having an optical system with a visualization device, such as an eyepiece, at a viewing end of the scope allowing an operator of the range finder to directly view a magnified image of a distant area at which an aiming end of the scope is pointed. Weapons or firearms that have laser range finders are typically equipped with such scopes, and both the scope and the laser range finder may be mounted on or integrated with the body of the weapon or firearm thereby forming a structural unit. In the case of weapons that have target acquisition/fire control systems, this system too may be mounted on or integrated with the body of the weapon to be part of the structural unit. In order to find the range to an intended remote target, the operator must first position the aiming end of the scope to be pointed at the target, such that the target will be contained within the image seen by the operator through the visualization device, and the operator must then identify the target within the image seen through the visualization device. The optical system usually includes an aiming point such as a fixed ranging reticle superimposed over the image seen through the visualization device, and the operator must usually position the scope to center the reticle on the identified target as accurately as possible in order to accurately align the target with the transmission path of the laser beam to be transmitted from the laser range finder if actuated by the operator for range acquisition. Positioning the scope to center the reticle on the target ordinarily requires that the entire structural unit that the scope is part of be manually moved and positioned by the operator by hand. Because the scope's reticle is normally very small in size, the manual movement required of the operator to center the reticle on the target will usually need to be precise and well-controlled.

Difficulties may arise in range acquisition when the operator of the laser range finder must identify the intended target in the image observed through the visualization device. Oftentimes the target is not easily and/or quickly distinguishable by sight in the image seen by the operator through the visualization device. In many cases, for example, it may be very hard for the operator to visually detect, differentiate or discriminate the target from the background and/or from other objects or features contained in the image seen through the visualization device. In military situations, potential targets are in fact routinely camouflaged or otherwise deliberately made to look similar to their surroundings. Furthermore, despite magnification, the target may appear quite small in the image seen through the visualization device due to the target being a considerable distance from the operator. Consequently, the operator may require more time to study the image and/or may make an error in target identification. Making an error in target identification may result in acquisition of a range to an object or location that is not the correct intended target. If this range is relied on to program the detonation point for ammunition fired from a weapon, the ammunition will not detonate at the optimal location for the correct intended target to be neutralized or destroyed and in fact may cause unintended damage.

Range acquisition may also be more difficult where there is extraneous movement of the operator and/or movement of the intended target. In particular, manually moving and positioning the scope, and/or the entire structural unit that the scope is part of, by hand in order to center the scope's reticle on the target is made considerably more difficult when the operator experiences unintentional extraneous movement and/or when the target is a moving target. Unintentional extraneous movement of the operator of a laser range finder may be caused by various conditions intrinsic or extrinsic to the operator that result in unintentional movement being imparted to the hand or hands of the operator. Operators, such as soldiers in an active military situation, facing stressful conditions and/or constantly varying or unpredictable environmental conditions are especially prone to experience unintentional extraneous movement that interferes with the operator's ability to align an intended target with the transmission path of the laser beam to be transmitted from the range finder. Unintentional extraneous movement of an operator may be caused, for example, by operator jitter or unsteadiness, by physical or emotional stress, by respiration, by heartbeats, by vibration or other movement of a vehicle, surface or structure in or on which the operator is located, and/or by various other conditions. Unintentional extraneous movement of the operator impairs the operator's ability to execute controlled manual movement of the scope and/or other associated structure so that the scope's reticle, and therefore the transmission path of the laser beam to be transmitted from the range finder, are accurately aimed at the target and makes it very difficult for the operator to hold the scope and/or other associated structure steady in a position where the reticle, and therefore the transmission path of the laser beam, are accurately aimed at the target long enough to perform range acquisition. Even in the case of a stationary target, the problems arising from unintentional extraneous movement of the operator increase the time it takes to obtain an accurate range due to the inherent difficulties associated with manually aiming the reticle, and therefore the transmission path of the laser beam, at the target and keeping the reticle and the transmission path of the laser beam aimed at the target long enough to acquire the range to the target.

Accurately aligning the target with the transmission path of the laser beam to be transmitted from the range finder may also be more difficult when the target is in motion due to various conditions intrinsic or extrinsic to the target, and especially when the target is attempting to evade detection. When the target is in motion, the operator will ordinarily need to manually move the scope and/or other associated structure to follow the moving target with the scope's reticle. Similar to the situation where the operator experiences movement, the moving target situation increases the difficulty of range acquisition and increases the time it takes for the operator to obtain an accurate range. The problems associated with following a moving target are exacerbated when the operator experiences unintentional extraneous movement while at the same time attempting to follow the moving target.

Where the scope is associated with structure, such as a heavy weapon, forming a heavy structural unit that must be manually moved and positioned in conjunction with aiming the transmission path of the laser beam at the target, the mass of the structural unit or associated structure may make it more difficult for the operator to execute the controlled manual movement needed to follow the target, to accurately aim the transmission path of the laser beam at the target, and to maintain the transmission path of the laser beam aimed at the target long enough to acquire the range to the target. The small size of the reticle may further increase the demand on the operator for controlled, precise manual movement of the scope and/or associated structure. The increased difficulty or demand on the operator arising from the mass of the structure that needs to be moved and/or the small size of the reticle are exacerbated when the target is in motion and/or when the operator experiences unintentional extraneous movement as described above.

Accordingly, it can be an extremely challenging task for an operator of a laser range finder to correctly identify an intended target and obtain an accurate range or distance measurement to the intended target, particularly in the event of movement of the target and/or unintentional extraneous movement of the operator, and particularly under the conditions in which laser range finders are often used.

Weapons, such as guns, that are equipped with conventional laser range finders must normally have the range finder "calibrated" to the weapon. Usually the weapon has a barrel or bore from which ammunition is discharged when the weapon is triggered or fired. In order for the laser range finder to acquire a range to the target that accurately correlates with the optimal distance from the end of the barrel for the ammunition to reach the target and/or at which the ammunition must detonate to deliver its maximum effect to the target, it is important that the transmission path of the laser beam that would be transmitted from the range finder for range acquisition be exactly parallel (within achievable limits) to the barrel of the weapon. Consequently, it is currently necessary to "calibrate" laser range finders to their associated weapons by mechanically adjusting the position of the range finder relative to the weapon as needed for the fixed transmission path of the laser beam to be parallel to the barrel of the weapon. The mechanical calibration process has numerous disadvantages including being tedious, being time consuming, and being subject to human error.

U.S. Pat. No. 6,145,784 to Livingston is representative of a target tracker implemented in conjunction with a laser weapon for tracking targets, namely missiles in flight. In one embodiment, the target tracker illuminates the target with radiation of a first wavelength and a laser beam from the laser weapon engages the target and forms a hit spot thereon. An optics subsystem receives and detects both the illuminated target and the hit spot, and the laser beam is steered by a controller in response to the detected target and hit spot locations. In another embodiment which does not include an illuminator laser, an optics subsystem of the target tracker separately images the target radiation and the laser hit spot radiation through use of a blocking filter. The blocking filter ensures that only radiation at the target radiation wavelength passes to a first detector, while only radiation at the target hit spot wavelength passes to a second detector. A controller then steers the laser beam generated by the laser weapon in response to the detected target and target hit spot locations. In addition to being mechanically and procedurally complicated, the systems contemplated by Livingston are not covert and are not small enough in size to be practically implemented in a manner to assist an operator or soldier operating a hand-held weapon or device. Rather, the fact that the systems are designed for in-flight missiles requires that they be heavy and large in size.

U.S. Pat. No. 7,022,971 B2 to Ura et al is illustrative of a laser measurement apparatus employing laser beams to perform measurements capable of tracking a targeted moving object in a pre-defined environment. Laser beams of different wavelengths are required to be directed toward a corner cube attached to the object, thereby requiring that the object be "cooperative". Steering of a laser beam is implemented via a complicated arrangement involving a motor for rotating a reflecting mirror and a motor for rotating a case that houses the reflecting mirror as well as the other major components of the apparatus. The steering arrangement disclosed by Ura et al is not one that could be practically miniaturized for use in a hand-held device.

U.S. Pat. No. 6,031,606 to Bayer et al presents another example of target tracking involving a cooperative or voluntary target. The target is detected automatically and its angular coordinates are determined automatically in accordance with two-dimensional image coordinates obtained by processing a pixel image of the target. The target tracking is designed for geodesic measurements, and the device disclosed by Bayer et al for accomplishing target tracking is a theodolite.

A weapon aiming system incorporated in manually aimed weapons, particularly machine guns, is represented by U.S. Pat. No. 5,686,690 to Lougheed et al. The aiming system uses a sensor for providing a video signal or series of frames representing a field of view, a video display device for displaying the field of view, and a digital signal processor for processing the video signal. The weapon may optionally include a separate laser range finder for measuring the range to a target and supplying the measurement to the signal processor. The system is designed to allow an operator to operate the weapon via the video display, which provides the field of view of the weapon as well as additional information such as boundary masks and a ballistic-corrected aim point, i.e. the point where the weapon would hit if fired, taking into account the range to the target.

U.S. Pat. No. 6,973,865 B1 to Duselis et al pertains to a system for evaluating the performance of a weapon system and of a human gunner operating an automated fire control system. The evaluating system is designed primarily for training purposes. The main concept of the system involves co-aligning a camera with the barrel of a weapon and imaging the target, or at least the direction toward which the barrel is aimed, at the time the weapon is fired. The evaluating system includes a firing-image source having a known imaging relation relative to a pointing direction of the barrel of the weapon. The firing-image source produces a firing image upon receipt of an image trigger command from the fire control system, which requires an electronic trigger. A computer receives the firing image and determines a calculated strike location from the firing image and from the range of the gun to a target.

A method and apparatus for processing images acquired via an electro-optical system is disclosed in U.S. Patent Application Publication No. US2006/0188169 A1 to Tener et al. The method and apparatus pertain primarily to image enhancement and rely on multiple images of the same object being captured by the electro-optical system. More specifically, the quality of the overall image is improved through registration, averaging, filtering, and other image processing techniques.

In view of the difficulties associated with target tracking, as defined herein to include identifying or detecting a remote target as well as following its position, it would be advantageous to provide a system and method for automatic target tracking that facilitate and assist in identifying and following an intended remote target by capturing and processing a series of video images containing the remote target. In view of the problems associated with aiming the transmission path of a laser beam to be transmitted from a laser range finder at a remote target, it would also be advantageous to provide a system and method for beam steering by which the transmission path for a laser beam to be transmitted from a laser range finder is automatically steered to be accurately aimed at the target that is tracked by the target tracking system. Providing systems and methods for automatic target tracking and beam steering would decrease the time required to correctly identify intended targets and obtain accurate range measurements to the correct intended targets, would ease the difficulties facing operators of laser range finders, would automatically compensate for movement of the target and/or extraneous movement of the operator, and would be useful for various purposes and/or in various practical applications in addition to range finding. Furthermore, it would be advantageous to provide automated systems and methods for target tracking and beam steering that are capable of being embodied in a structural assembly that is miniaturized or made small enough in size for it to be integrated into a hand-held weapon system or other hand-held portable device, and especially for it to be integrated into a target acquisition/fire control system of a weapon system. Providing automated systems and methods for target tracking and beam steering having the aforementioned features would expand the types of practical applications and the types of devices in which automatic target tracking, automatic beam steering, and/or automated-assisted range finding can be effectively and advantageously implemented. An additional area of use in which automatic target tracking and beam steering systems and methods would be advantageous involves calibration, and especially calibration of laser range finders, where the transmission path of a beam must be accurately positioned with respect to a feature of reference, such as the barrel of a weapon. Automatic target tracking and beam steering systems and methods that can be used for calibrating laser range finders to weapons would allow calibration to be performed electronically, thereby obviating the need for mechanical calibration and its attendant drawbacks.

SUMMARY OF THE INVENTION

The present invention is generally characterized in automatic target tracking and beam steering systems and methods, which can be integrated with a laser range finder to provide automated steering for a laser beam to be transmitted from the range finder for range acquisition. The range finder includes a transmission system having a laser source for emitting a laser beam transmittable from the range finder in the form of a transmitted laser beam extending along a steerable beam transmission axis or path to a remote target, and a receiver system for receiving a reflected laser beam that is reflected from the target back to the range finder. The receiver system operates to calculate the distance or range to the target based on the travel time of the transmitted and reflected laser beams. The automatic target tracking system includes a target identification aspect and a target tracking aspect. The automatic target tracking system comprises an image capturing system for acquiring a series of images in real time of a distant area containing the remote target, and a processing system for processing the acquired images to identify the target and follow its position across the series of images. The target identification aspect of the target tracking system involves locating one or more targets and potential targets in each image or frame. The target tracking aspect of the target tracking system involves following, evaluating or tracking one or more targets and potential targets from image to image, i.e. frame to frame, over time. The automatic beam steering system is controlled by the processing system to steer or reconfigure the beam transmission axis to be aimed at a target being tracked by the target tracking system, so that the transmitted laser beam will be transmitted from the range finder at the appropriate angle and in the appropriate direction to be aimed at the target. The beam steering system may accomplish steering of the beam transmission axis by decentering or adjusting the position of one or more components of an optical system, and the laser source can be a component of the optical system that is decentered or adjusted to accomplish steering of the beam transmission axis. A beam steering system based on decentering the laser source includes an actuator for moving the laser source in two directions along a first axis and in two directions along a second axis, perpendicular to the first axis, which translates into angular and directional steering of the beam transmission axis in a horizontal (x) direction and/or a vertical (y) direction. Movement of the laser source and/or other optical component can be along axes contained in a single plane, which allows the gravitational force that must be overcome by the actuator to move the laser source and/or other component to be minimized so that less actuating force is needed to move the component(s). The processing system can be designed to track the target from the captured images by performing an analysis based on target motions. The laser range finder can include a scope having a visualization device via which an image of the distant area is viewable by an operator.

In an automatic target tracking system and method where the target tracking is based on target motions, the image processing may involve image stabilization, image differencing, thresholding, and application of a target tracking algorithm. The target tracking algorithm may involve particle filtering or, alternatively, a kinematic tracking algorithm applying a Kalman filter.

Various objects, advantages, and benefits of the subject invention will become apparent from the following description of the preferred embodiments when taken in conjunction with the accompanying drawings.

DESCRIPTION OF THE PREFERRED EMBODIMENTS

Figure 1:
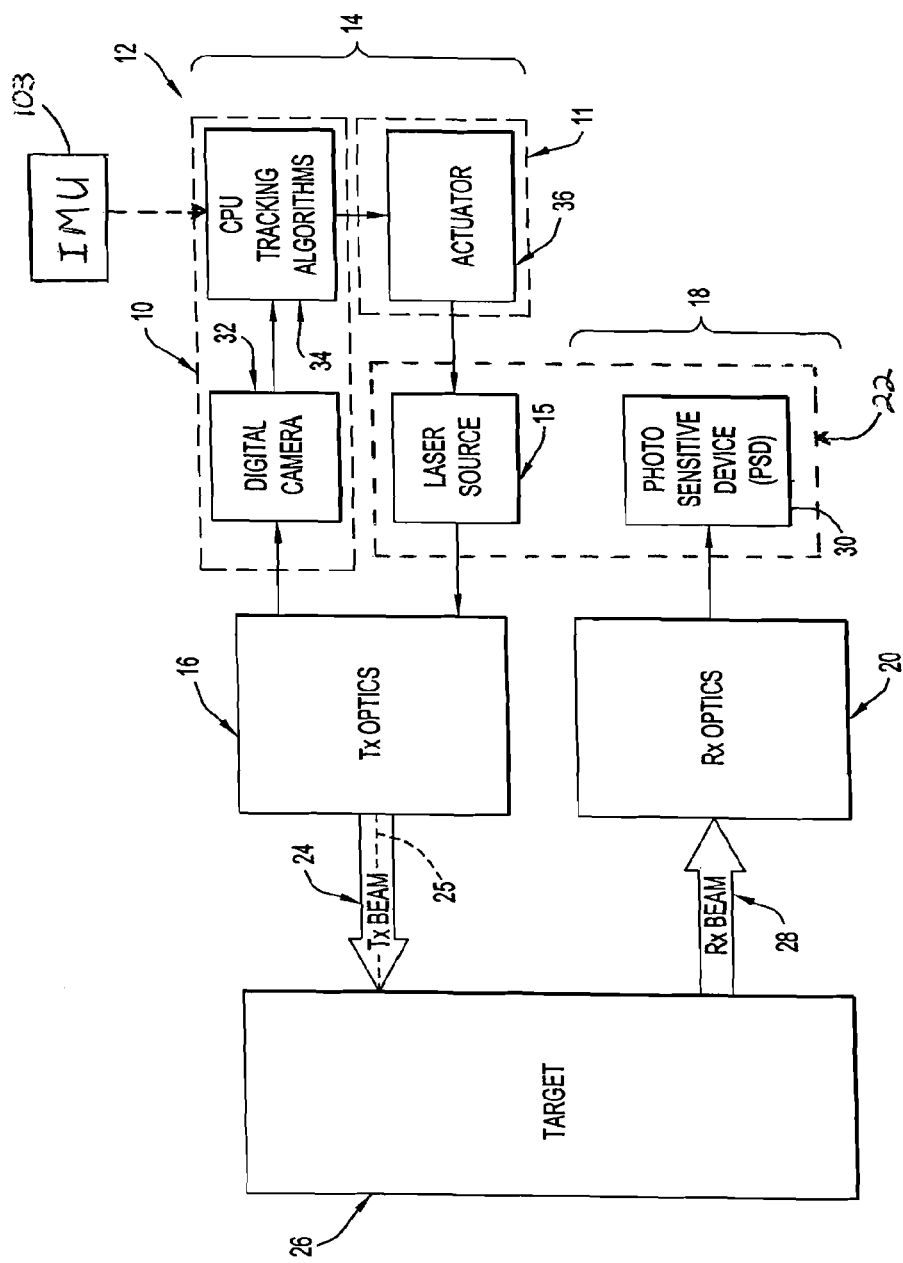
FIG. 1 is a block diagram depicting a system and method for automatic target tracking and a system and method for automatic beam steering incorporated in a steerable laser range finder.

An automatic target tracking system 10 and an automatic beam steering system 11 incorporated in a steerable laser range finder 12 are depicted in the diagram of FIG. 1. The laser range finder 12 comprises a transmission system or channel 14 including a transmission optical system 16 having a laser source 15 and a receiver system or channel 18 including a receiver optical system 20 and a range finding module 22. The laser source 15 may be any suitable device for emitting a laser beam to be transmitted from the laser range finder 12 in the form of a transmitted laser beam (Tx BEAM) 24 extending along a steerable beam transmission path or axis 25 to a remote target 26 for which a range is to be acquired. The target 26 may be an animate or inanimate, stationary or moving object located remote or at a distance from the range finder 12 and for which it is desired to acquire a range, i.e. a measurement of the distance from the range finder 12 to the target 26. The transmission optical system 16 includes transmission optics (Tx OPTICS) suitable for focusing the transmitted laser beam 24 on the remote target 26, which reflects laser light back to the range finder 12 in the form of a reflected laser beam (Rx BEAM) 28. The receiver optical system 20 includes receiver optics (Rx OPTICS) suitable for receiving the reflected laser beam 28 and directing it to a light sensor 30 of the range finding module 22. The range finding module 22 includes the laser source 15 and the light sensor 30 which operates in conjunction with the laser source 15. The laser source 15 may thusly be considered a component of the transmission system 14/optical system 16 and/or the range finding module 22. The range finding module 22 may include a light sensor 30 such as a photosensitive device (PSD) and/or any suitable hardware and software needed to measure the time taken for the laser light to travel from the range finder 12 to the target 26 and be reflected from the target 26 back to the range finder 12, and to use this measurement and the known speed of the laser light that constitutes the transmitted and reflected laser beams to calculate the distance or range to the target 26. Typically, the range finding module 22 will operate by calculating the range to the target in accordance with the "time of flight" principle as conventionally employed in the field of laser range finding. Typically, the transmission system 14 and the receiver system 18 will be disposed in a housing or enclosure. The laser range finder 12 will normally include a trigger or activator for the operator to control transmission of the laser beam 24 from the range finder by turning the laser source 15 "on", i.e. a state in which the laser source emits a laser beam, and "off", i.e. a state in which the laser source does not emit a laser beam. The trigger or activator may include an appropriate switch conveniently located to be engaged by the operator. When the range finder 12 is activated to initiate emission of a laser beam from the laser source 15, the transmitted laser beam 24 will be transmitted from the range finder along the currently steered beam transmission axis 25 as explained further below. The basic components and operation of the laser range finder 12 can be essentially the same as those in conventional laser range finders, with only the transmission system or channel 14 being modified from the transmission systems or channels found in conventional laser range finders to incorporate the automatic target tracking and beam steering systems and methods. Accordingly, the automatic target tracking system 10 and the automatic beam steering system 11 are shown as part of the transmission system 14 in FIG. 1. Alternatively, the basic components and operation of the laser range finder 12 can be essentially the same as those in conventional laser range finders with only the receiver system or channel 18 being modified from the receiver systems or channels found in conventional laser range finders to incorporate the automatic target tracking systems and methods. It should be appreciated that the automatic target tracking and beam steering systems and methods can be incorporated in a laser range finder or other device having a single channel comprising both the transmission system and the receiver system, two channels respectively comprising the transmission system and the receiver system, or three channels respectively comprising the transmission system, the receiver system and a video camera of the target tracking system, for example.

The target tracking system 10 comprises an image capturing system 32 for capturing or obtaining a series of video images or frames of a distant area containing the target 26, and an image processing system 34 for processing the video images to automatically track the target 26. The "tracking" that is performed by the target tracking system 10 is defined herein to include identification or detection of the target 26 from the captured images as well as following or tracking the target 26 in the event its position changes as explained further below. More specifically, the "target tracking system" and the "tracking" performed thereby as defined herein includes a target identification aspect and a target tracking aspect. The target identification aspect involves locating or identifying one or more targets and/or potential or candidate targets in each captured image or frame, and target identification is thusly completed within a given image or frame. The target tracking aspect involves tracking, following or evaluating the one or more targets and/or potential or candidate targets from image to image, i.e. frame to frame, over time. As part of the target tracking aspect, real or actual targets are differentiated from those that are not. Accordingly, although there is a difference between the target identification aspect and the target tracking aspect, both are intended to be encompassed by the "target tracking system" and the "tracking" performed by the "target tracking system" as defined herein. The beam steering system 11 automatically steers or reconfigures the beam transmission axis 25 to be aimed at the target 26 as it is tracked by the target tracking system 10, and does so by adjusting the position of one or more components of the optical system 16. The laser source 15 and/or a lens of the optical system may be the component(s) that is adjusted as explained further below. The beam transmission axis 25 may be considered an imaginary longitudinal axis or line on which the transmitted laser beam 24 is centered when it is transmitted from the laser range finder 12. The position of the laser source 15 or other component of the optical system dictates what angle and in what direction the beam transmission axis 25 extends from the laser range finder 12, and the beam transmission axis 25 is steerable angularly and directionally by adjusting the position of the laser source 15 or other component. When the transmitted laser beam 24 is then transmitted from the range finder 12, it extends from the range finder along the current steered beam transmission axis 25. The beam steering system 11 comprises a positioning mechanism 36 for moving the laser source 15 or other component as necessary so that the beam transmission axis 25 is steered to be aimed at the tracked target, even as the position of the tracked target changes in real time. The positioning mechanism 36 is automatically controlled by the image processing system 34 in response to the target tracking performed by the image processing system.

Figure 2:
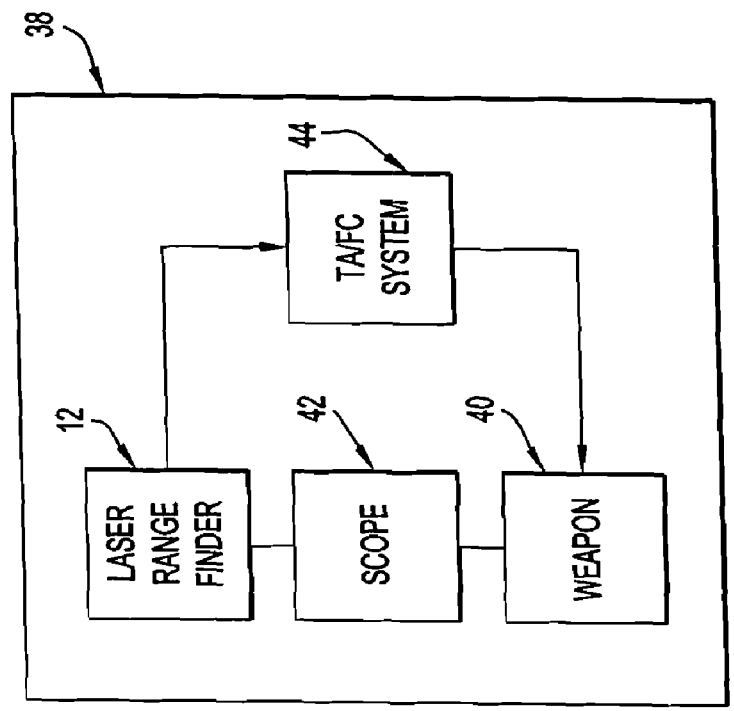
FIG. 2 is a block diagram depicting the steerable laser range finder integrated in a weapon system.

The steerable laser range finder 12 may be integrated or incorporated in a weapon system 38 as shown in FIG. 2. FIG. 2 depicts the weapon system 38 as including a weapon 40, a scope or telescopic sight 42, a target acquisition/fire control system (TA/FC SYSTEM) 44, and the steerable laser range finder 12. The laser range finder 12 may be incorporated in or designed to be part of the target acquisition/fire control system 44. The weapon 40 may be an air bursting weapon designed to fire or discharge air bursting ammunition, such as air bursting shells, bullets or grenades, capable of detonating or exploding in the air without requiring impact. The weapon 40 will typically have a barrel or bore through which the ammunition is discharged when the weapon is triggered or fired. The scope 42, which may be integrated or incorporated in or with the target acquisition/fire control system 44, includes an optical system with a visualization device, which may be located at a viewing end of the scope, through which a magnified image can be directly viewed of a remote or distant area at which an aiming end of the scope 42 is pointed. The optical system of the scope 42 may include an aiming or ranging reticle superimposed over the image seen with the visualization device. The target acquisition/fire control system 44 may allow an operator, typically a soldier, to program a detonation point located a particular distance from the barrel of the weapon 40 at which the ammunition will detonate if the weapon is triggered or fired. The scope 42 and/or the target acquisition/fire control system 44 can be the same or essentially the same as those proposed for use in weapon systems and in air bursting weapon systems in particular. However, it should be appreciated that the weapon systems can be those designed for use with ammunition other than air bursting ammunition.

In order to program an accurate detonation point so that the ammunition discharged from weapon 40 detonates at the optimal location to destroy or neutralize an intended target or to deliver the maximum effect from the ammunition to the intended target, the operator must first use the laser range finder 12 to obtain an accurate distance or range to the intended target. The range to the target that is acquired using the laser range finder 12 is employed by the target acquisition/fire control system 44 to calculate the detonation point and to program the ammunition to detonate at the detonation point, such as by setting a fuse for the ammunition to explode after it has traveled a certain distance in the air. Acquisition of an accurate range to the target allows calculation of the detonation point to include compensation for the trajectory of the ammunition upon discharge from the weapon. If the programmed detonation point is based on an inaccurate range to the intended target and/or is based on a range to an object or location that is not the correct intended target, the ammunition discharged from the weapon 40 will detonate at a point or location where the correct intended target is not neutralized or destroyed or does not receive the maximum effect from the ammunition. Consequently, the effectiveness of the weapon may be impaired, especially in the case of air bursting ammunition that provides higher lethality or effect in a lateral direction than in a vertical or depthwise direction, and unwanted collateral damage may occur. The automatic target tracking and beam steering systems and methods incorporated in the range finder 12 make it easier and faster for the operator to obtain an accurate range to the correct intended target.

Figure 3:
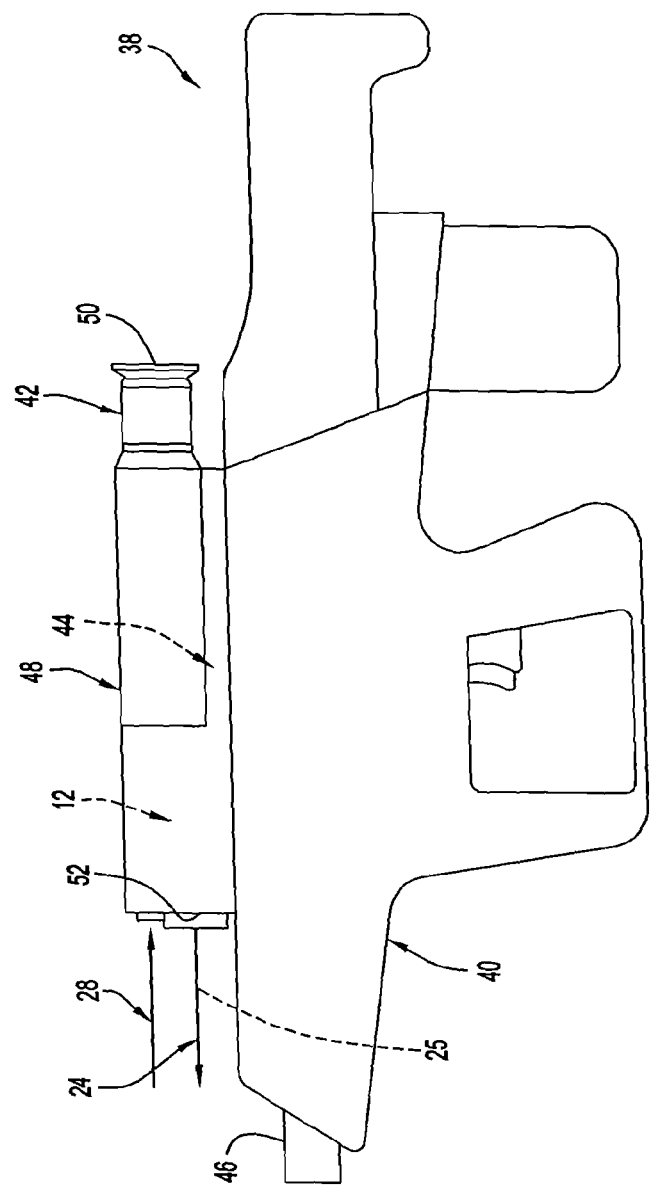
FIG. 3 is a side view of the weapon system embodied in an illustrative weapon.

It should be appreciated that the structure and operation of the weapon 40 can vary in accordance with various factors including the type, size/caliber, and/or effective range for the ammunition that the weapon is designed to discharge. By way of example, FIG. 3 depicts the weapon system 38 embodied in a weapon 40 that is designed as an air bursting grenade launcher. In this example, the weapon 40 is a hand-held firearm designed to fire 25 mm air bursting grenades from the barrel 46 of the weapon. A housing 48 integrated with the body of the weapon 40 provides an enclosure for components of the laser range finder 12, the scope 42 and/or the target acquisition/fire control system 44. The scope 42 includes an optical system having a visualization device 50, such as an eyepiece or lens, at a viewing end of the scope 42, and the scope has an aiming end 52. The optical system of the scope can be designed in various ways and with various optical components to enable the operator to view via the visualization device 50 a magnified image of a remote or distant area at which the aiming end 52 is pointed. The transmitted laser beam 24 is transmitted from the transmission system of the range finder 12 along the steerable beam transmission axis 25, and the reflected laser beam 28 travels back to the receiver system of the range finder as shown by arrows in FIG. 3. In a more specific example, the weapon 40 can correspond to the weapon known as the XM25 having the capability to impact targets at considerable ranges, for example 500-800 meters, and the target acquisition/fire control system 44 can correspond to that proposed for the XM25.

It should be appreciated that the steerable laser range finder 12 can be used in various devices and in various practical applications other than weapon systems. Normally, the steerable laser range finder 12 will be used in association with a scope, such as scope 42, and the scope 42 can be integrated with the steerable laser range finder 12 to form a unitary device. Furthermore, although the automatic target tracking and beam steering systems and methods are primarily described herein in conjunction with the steerable laser range finder 12, it should be appreciated that the automatic target tracking and beam steering systems and methods can be used for automatic target tracking and beam steering in various devices and in various practical applications apart from a laser range finder and range acquisition application. As described below in greater detail, the automatic target tracking system 10 and the automatic beam steering system 11 are capable of being implemented in a structural assembly that is miniaturized or small enough in size for the automatic target tracking and beam steering systems and methods to be integrated in a hand-held or portable device, thereby expanding the types of devices and practical applications in which the automatic target tracking and beam steering systems and methods can be used. For example, in addition to laser range finders, the automatic target tracking system 10 and the automatic beam steering system 11 may be implemented in laser designators, laser pointers and laser illuminators.

Figure 4:
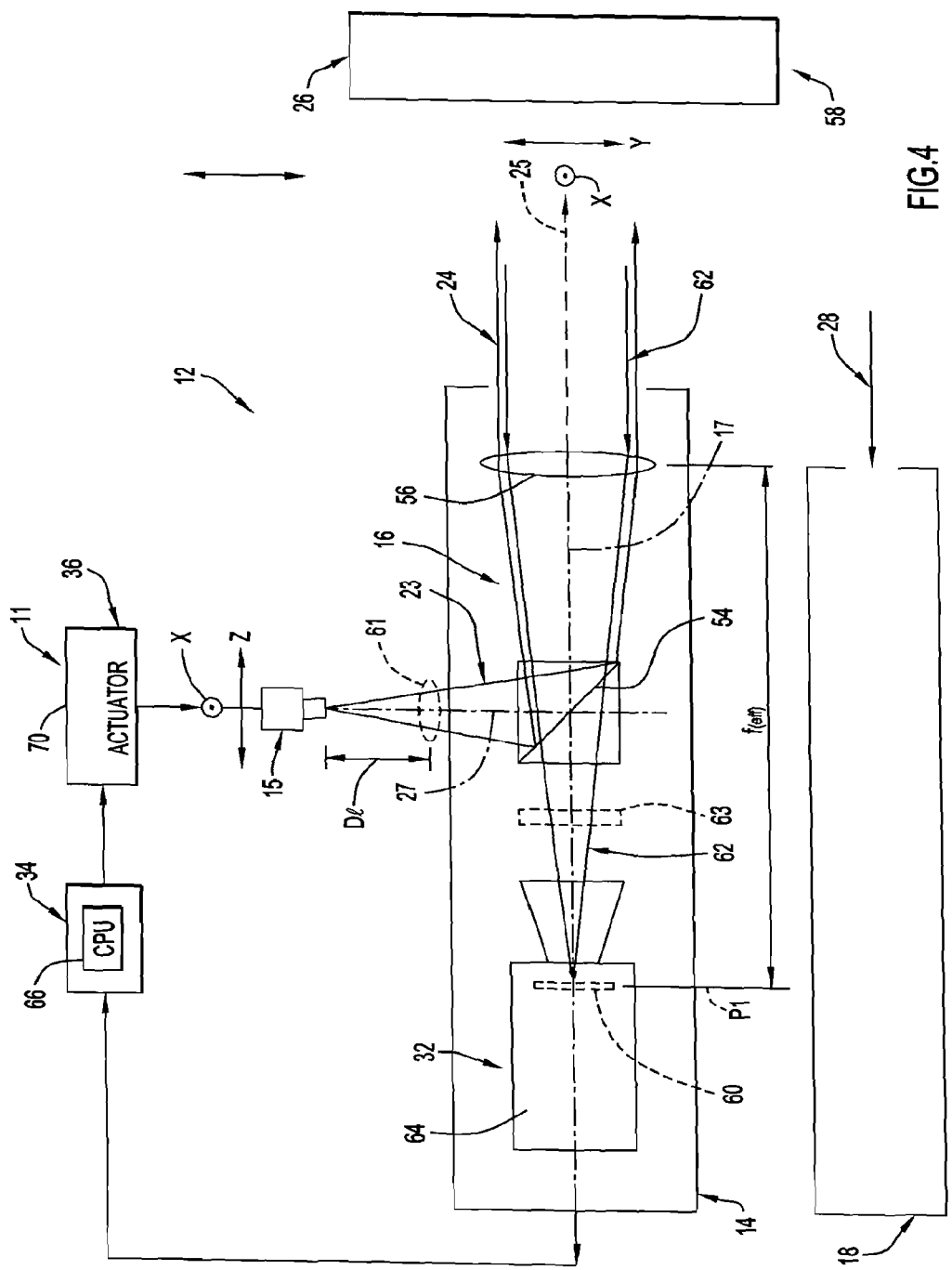
FIG. 4 is a schematic plan view of the steerable laser range finder incorporating the systems and methods for automatic target tracking and beam steering.
Figure 5:
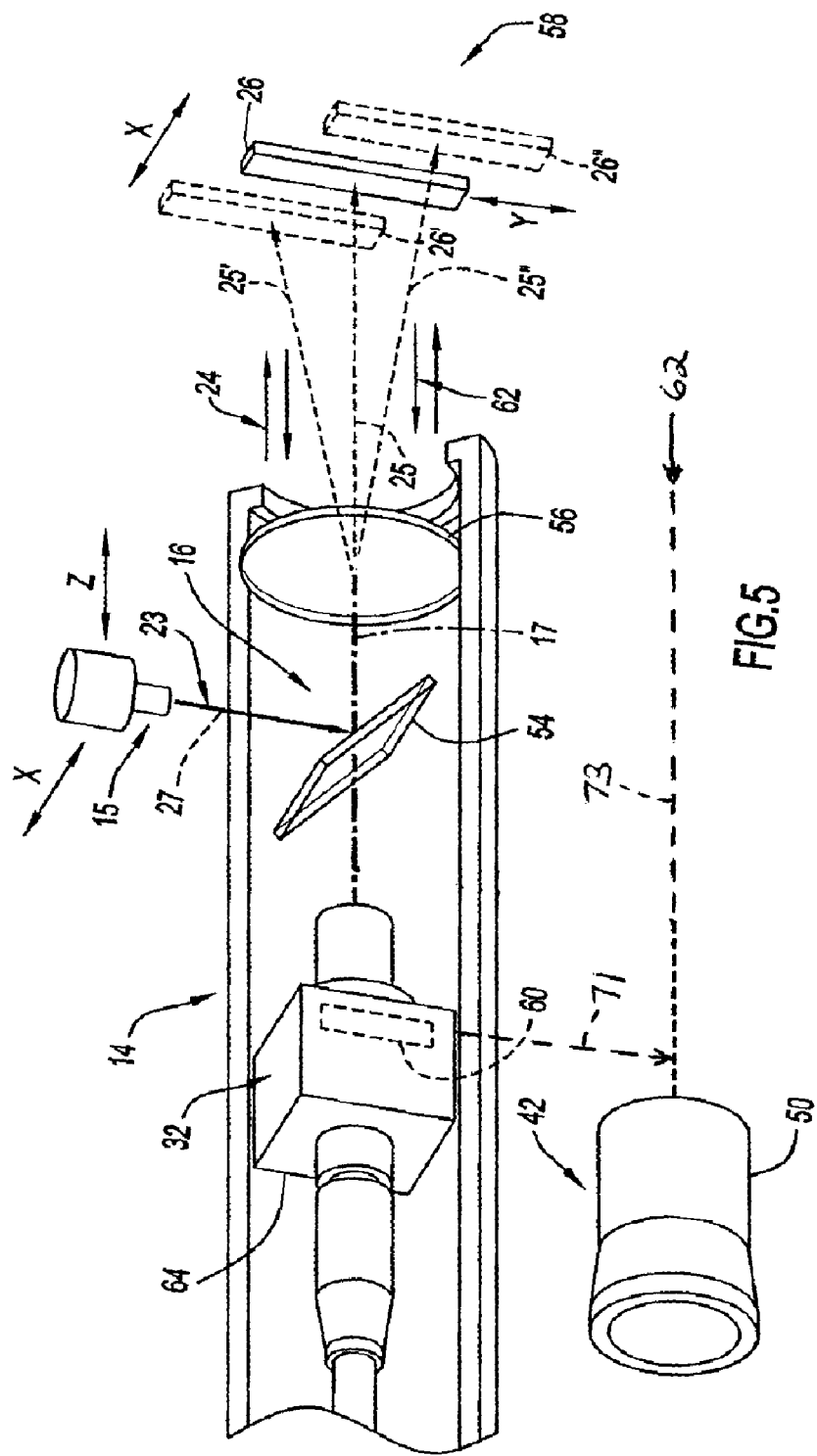
FIG. 5 is a schematic perspective view of a transmission system of the steerable laser range finder of FIG. 4 incorporating the systems and methods for automatic target tracking and beam steering.
Figure 6:
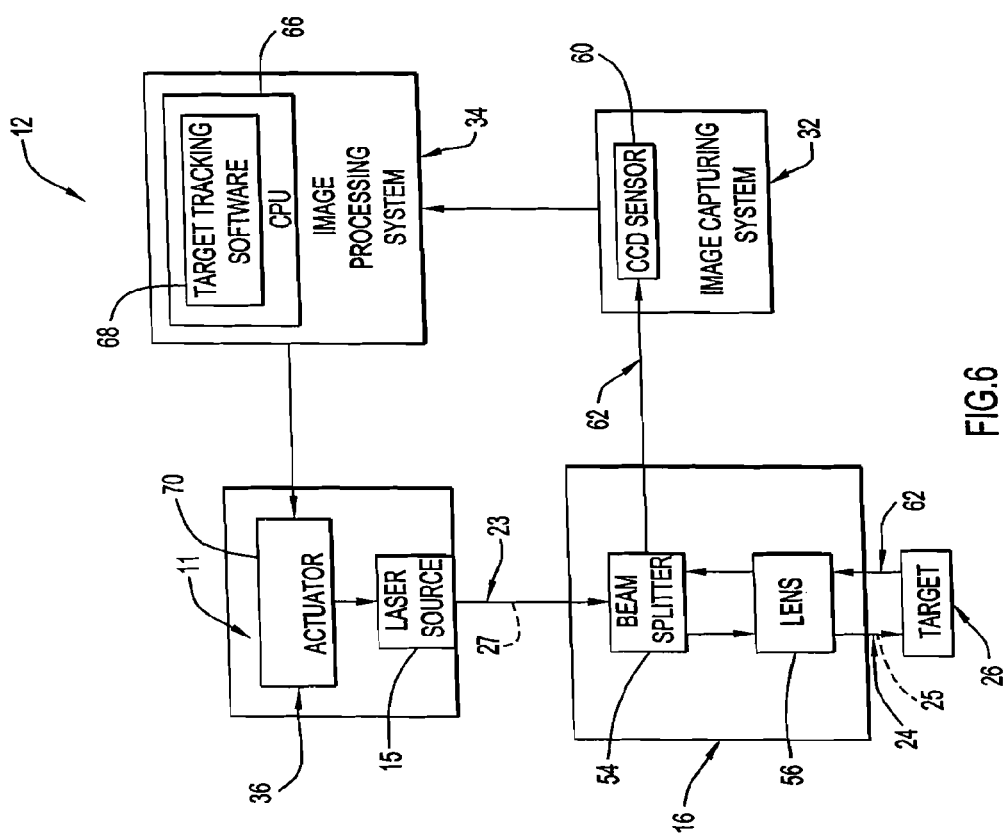
FIG. 6 is a block diagram representing structure and operation of the systems and methods for automatic target tracking and beam steering corresponding to FIGS. 4 and 5.

FIGS. 4, 5 and 6 provide a better understanding of the structure and operation of the automatic target tracking and beam steering systems and methods in general and as implemented in the steerable laser range finder 12. Since the automatic target tracking system 10 and the automatic beam steering system 11 are incorporated in the transmission system 14 of the range finder 12, the receiver system 18 of the range finder 12 is shown only in outline in FIG. 4 and is not shown in FIGS. 5 and 6. The laser source 15 emits a laser beam 23 when the range finder 12 is placed in the activated or "on" state, typically by the operator activating the trigger or activator of the range finder 12. In applications where covertness is important, the laser source 15 can be one that emits a laser beam 23 that is invisible to human eyesight. The laser source 15 can emit a laser beam 23 that is visible to human eyesight where covertness is not critical and/or where it is desired to illuminate the target. As best shown in FIGS. 4 and 5, the laser beam 23 is emitted from the laser source 15 along an emission path or axis 27 that is perpendicular to an optical axis 17 of the transmission optical system 16. The laser beam is depicted in FIG. 4 as being emitted from the laser source as a non-collimated beam. The emission axis 27 may be considered an imaginary axis or line on which the emitted laser beam 23 is centered when it is emitted from the laser source 15. The transmission optical system 16 includes a beam splitter 54 and an objective lens 56 that are centered on the optical axis 17. The objective lens 56 is located at the forward end of the transmission system 14 that is pointed toward or in the vicinity of a target 26 located in the distant area 58. For the sake of generality and simplicity, the target 26 is illustrated as a rectangular box. Also, it should be appreciated that the target 26 can be located a considerable distance from the range finder 12, and that the target 26 can vary in size from very small to very large. The beam splitter 54 is longitudinally spaced rearwardly from the objective lens 56 along the optical axis 17 and is situated between the lens 56 and an image sensor 60 of the image capturing system 32. The beam splitter 54 is a cube beam splitter disposed in such a way that the beam along axis 27 reflects along axis 17. The beam splitter 54 is situated in the path of the emission axis 27 so that the laser beam 23 emitted from the laser source 15 is directed to the beam splitter 54. The beam splitter 54 splits the laser beam 23 and redirects a portion thereof 90° from the emission axis 27 for passage through the lens 56. The redirected portion of the laser beam 23 is collimated and focused by the lens 56, and it constitutes the transmitted laser beam 24 that is transmitted from the transmission system 14 along the steerable beam transmission axis 25. Optionally, as shown in dotted lines in FIG. 4, a secondary lens 61 can be centered on the emission axis 27 between the laser source 15 and the beam splitter 54, such that the laser beam 23 passes through the secondary lens 61 before being directed to the beam splitter 54. The secondary lens 61 can be provided for various purposes, such as for shaping the laser beam, and the lens 61 would be moved or translated in conjunction with the laser source 15. By adjusting the distance Dl between the lens 61 and the laser source 15, the laser source 15 can be positioned closer to the beam splitter 54 while still ensuring that the transmitted laser beam 24 is collimated or in the form of parallel rays. Positioning the laser source 15 closer to the beam splitter 54 presents the advantage of further reducing the amount of space or size of the footprint required for the transmission system 14.

Still referring to FIGS. 4, 5 and 6, incoming light or radiance 62 is able to pass first through the lens 56 and then through the beam splitter 54 to the image capturing system 32 where the incoming light 62 is directed to or focused on the image sensor 60. The image sensor 60 is capable of acquiring a digital image of a distant area at which the lens 56 or forward end of the transmission system 14 is pointed, in this case distant area 58 containing target 26. In order to obtain a clear image, the image sensor 60 may be located at the focal plane P1 of the optical sub-system comprised of lens 56 and beam splitter 54 as shown in FIG. 4. Consequently, the distance between the image sensor 60 and the objective lens 56 is equal to or substantially equal to the effective focal length f(eff) of the optical sub-system comprised of lens 56 and beam splitter 54. As further shown in dotted lines in FIG. 4, a laser filter 63 may optionally be disposed between the beam splitter 54 and the image sensor 60 through which the incoming light 62 passes before being directed to the image sensor 60. As shown in FIG. 6, the image sensor 60 may include one or more charge coupled devices (CCD SENSOR) to effect image capture. As shown in FIGS. 4 and 5, the image capturing system 32 preferably comprises a video camera 64 containing the image sensor 60 and having a video capture card for capturing a series of digital video images or frames of the distant area 58 as a function of time. The camera 64 is preferably a high speed video camera of compact size, for example one having the general dimensions of 22 mm by 91 mm. The camera 64 used in the image capturing system 32 can be a visible spectrum camera for use in daylight or lit conditions, a thermal camera for use at night or in the dark, or a multi-spectral camera. The laser filter 63 would ordinarily be advantageous where the wavelength of the laser beam is within the bandwidth of the camera, i.e. whenever the camera is sensitive to the wavelength of the laser beam, and to prevent incoming light from flooding the camera. The images of the distant area 58 captured by the image capturing system 32 are continuously transferred to the image processing system 34 (not shown in FIG. 5). The image processing system 34 includes a processor or controller (CPU) 66, as shown in FIGS. 4 and 6, having target tracking software 68 as shown in FIG. 6. The target tracking software 68 operates to automatically track the target 26 across a series of images captured in real time. More specifically, the target identification aspect of the target tracking software 68 operates to automatically identify the target 26 in the captured images, and the target tracking aspect of the target tracking software 68 operates to automatically track the target 26 continuously across the images in the event that the position of the target 26 changes across the captured images.

As the image processing system 34 tracks the target 26, it transmits command or control signals to the beam steering system 11 (not shown in FIG. 5) to automatically move the laser source 15 as needed to directionally steer the beam transmission axis 25 to be aimed at the tracked target 26. When the image processing system 34 confirms that the beam transmission axis 25 is accurately aimed at or "locked" on the target 26, the range finder 12 is ready for range acquisition. Then, upon activation of the range finder 12 by the operator, the transmitted laser beam 24 extends from the range finder along the currently steered beam transmission axis 25 that is at the appropriate angle and in the appropriate direction for the transmitted laser beam 24 to be aimed precisely on the target 26. The image processing system 34 may be designed to generate a locked condition signal when the beam transmission axis 25 is locked on the target 26 to provide an indication to the operator that the range finder 12 is ready for range acquisition. The locked condition signal can be communicated to the operator in various ways, including visually and/or audibly. For example, a visual locked condition signal may comprise a light and/or an indicia superimposed over the image seen by the operator through the visualization device of the scope that is associated with the range finder. An audible locked condition signal may include a beeping sound.

The image processing system 34 controls the beam steering system 11 to compensate for positional changes of the target 26 by continuously adjusting the position of the laser source 15 as needed for the angle and direction of the beam transmission axis 25 to be aimed at the target 26 being tracked via the target tracking software 68. Positional changes of the target may result from extraneous movement of the operator and/or movement of the target as discussed hereinabove. Extraneous movement of the operator may be unintentional, such as operator jitter or nervousness, as also discussed hereinabove. The beam transmission axis 25 is steerable or configurable to follow positional changes of the target 26 resulting from displacement of the target in the vertical (y) direction and/or the horizontal (x) direction as shown by arrows in FIGS. 4 and 5. Steering of the beam transmission axis 25 is accomplished by moving the laser source 15 in two directions along the (x) axis and/or along the (z) axis as shown by arrows in FIGS. 4 and 5, the (x) axis being parallel to the (x) direction and the (z) axis being parallel to the optical axis 17. The axes (x) and (z) along which the laser source 15 may be moved can be disposed in the same plane, and this plane may be oriented horizontal to minimize the gravitational force that must be overcome by the actuator to move the laser source 15. The positioning mechanism 36 of the beam steering system 11 includes a two degree of freedom actuator 70 (ACTUATOR) for moving the laser source 15 in two directions along the (x) and (z) axes. The actuator 70 is a translational actuator. However, it should be appreciated that various types of actuators can be employed, including translational actuators, linear actuators, angular actuators and rotational actuators. The processing system 34 determines what movement along the (x) axis and/or the (z) axis is required for the laser source 15 from its then current position in order for the beam transmission axis 25 to be aimed at the target 26 in the current tracked position. This determination dictates the command or control signals that the processing system 34 transmits to the beam steering system 11 to control the actuator 70. Images of the distant area 58 continue to be captured and processed in real time by the target tracking system 10 to readjust the position of the laser source 15 and thereby steer or reconfigure the beam transmission axis 25 as necessary for it to be aimed at the target 26 in each new current tracked position, thereby forming an actively controlled feedback loop. The target tracking and beam steering processes are performed very rapidly, with images typically being processed within the time it takes for the next frame to be received, such that the target tracking system 10 will normally "lock" on the target and the range finder 12 will be ready for range acquisition very quickly after the operator has appropriately directed the forward or pointing end of the transmission system 14 toward the target 26. Once the target 26 is "locked", activation of the range finder 12 to emit the laser beam 23 from the laser source 15 will result in the transmitted laser beam 24 being transmitted accurately to the target 26.

FIG. 5 provides an example of what would generally occur during automatic target tracking and beam steering over a period of time in which the target 26 is being tracked by the target tracking system 10 as the position of the target 26 is changing due to motion, such as that caused by operator jitter. The target 26 is shown in FIG. 5 at a current position. Prior to the target 26 arriving at the current position, it was at an earlier position represented by the target 26' shown in dotted lines. During the period of time in which the target 26 is being tracked, images of the target are continuously being captured and processed by the target tracking system 10 to determine the then current position of the target. Each captured image is processed in relation to an earlier captured image. When the earlier position of the target was determined to be the then current tracked position, the beam transmission axis shown at 25' was automatically steered by the beam steering system 11 to be aimed at the target 26' in the earlier position. Assuming a range was not acquired for the target 26' while the earlier position was the current tracked position, and assuming the position of the target changes from the earlier position to the current position represented by target 26, images of the target continue to be captured and processed such that the current position is determined to be the then current tracked position. Consequently, the beam transmission axis 25 is automatically steered by the beam steering system 11 to be aimed at the target 26 in the current position. Assuming a range is not acquired for the target 26 while the current position is the current tracked position, and assuming the position of the target changes to a future position represented by target 26", images will continue to be captured and processed such that the future position will be determined to be the then current tracked position. In response to this determination, the beam transmission axis shown by 25" will be steered by the beam steering system 11 to be aimed at the target 26" in the future position.

Figure 7A:
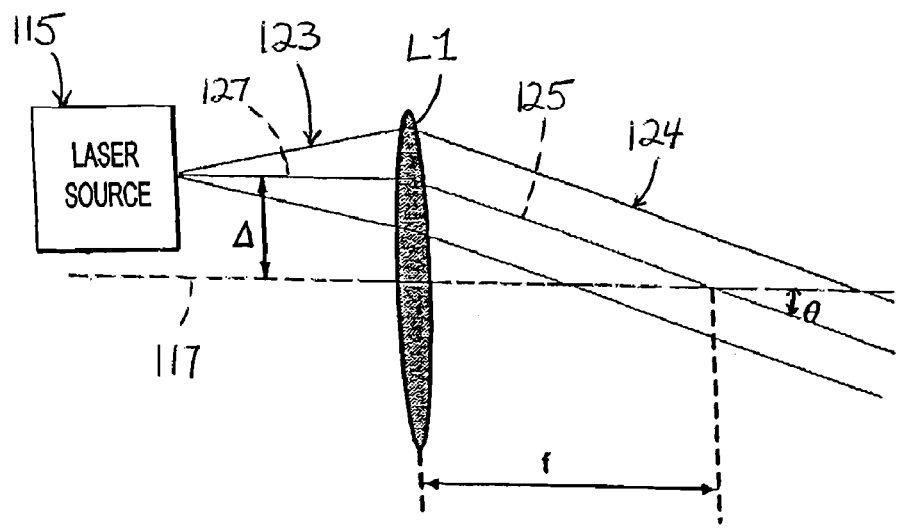
FIG. 7a is a diagram illustrating the concept of laser beam steering by decentering the laser source.

The scientific principle or methodology by which steering of the beam transmission axis 25, and therefore the transmitted laser beam 24, is accomplished in the beam steering system 11 is based on decentering the laser source 15 with respect to the optical axis 17 and is exemplified in concept with reference to FIG. 7a. FIG. 7a shows a laser beam 123 emitted from laser source 115 along an emission axis 127 and directed through an objective lens L1, where the emission axis 127 is decentered relative to the optical axis 117 of lens L1. Lens L1 has a focal length f. The laser source 115 and the emission axis 127 for the emitted laser beam 123 are offset or decentered from the optical axis 117 by an offset or decentered distance Δ, the optical axis 117 being the axis for the optical system. In the example shown in FIG. 7a, the direction that the emission axis 127 is offset or decentered from the optical axis 117 by the distance Δ is upward in the vertical direction from the optical axis 117. The emitted laser beam 123 passes through the lens L1 upon being emitted from the laser source 115, and is transmitted from the lens L1 as a transmitted laser beam 124 extending along the beam transmission axis 125 disposed at a steering angle θ to the optical axis 117 and extending in a direction opposite the direction that the emission axis 127 is offset from the optical axis 117. Hence, in the example depicted in FIG. 7a, the beam transmission axis 125 extends downward in the vertical direction at angle θ from the optical axis 117. Various steering angles in the vertical and horizontal directions can be obtained for the transmitted laser beam 124 by controlling the size and the direction of the offset distance Δ for the laser source 115 and the emission axis 127.

The steering angle θ of the beam transmission axis 125 for the transmitted laser beam 124 with respect to the decentered or offset distance Δ can be approximated in accordance with the following equation:

$$\theta = \arctan\left(\frac{\Delta}{f}\right)$$

where θ is the deflection or steering angle of the beam transmission axis 125, Δ is the offset or decentered distance, and f is the focal length of the optical lens. In the arrangement depicted in FIG. 7a, a single lens, L1, is employed. However, it should be appreciated that the concept of beam steering by moving the laser source 115 can be implemented using an arrangement that includes a plurality of lenses. Moreover, the arrangement depicted in FIG. 7a can be modified so that the lens L1 is the component that is decentered relative to the laser source.

The decentering principle can be employed in the beam steering system 11 through movement of the laser source 15, and with it the emission axis 27, along the (x) axis and/or the (z) axis. Referring again to FIGS. 4 and 5, when the laser source 15 and the emission axis 27 are in a nominal position centered with the center of the beam splitter 54, the beam transmission axis 25 will be in a nominal position coaxial with the optical axis 17. In FIGS. 4 and 5, the beam transmission axis 25 is shown in the nominal position. If the laser source 15 is moved along the (x) axis and/or the (z) axis from its nominal position, the laser source 15 and emission axis 27 will be decentered or offset from the center of the beam splitter 54 by an offset distance, resulting in the beam transmission axis 25 being disposed at a steering angle to the optical axis 17. In FIG. 5, the beam transmission axes 25' and 25" represent the beam transmission axis 25 steered from its nominal position. The size of the steering angle and the direction that the beam transmission axis 25 extends from the lens 56 in relation to the optical axis 17 will depend on the size and direction of the offset distance, which depends on the amount and direction of movement of the laser source along the (x) axis and/or along the (z) axis. In the beam steering system 11, steering of the beam transmission axis 25 in the vertical (y) and horizontal (x) directions is decoupled or independent in that movement of the laser source 15 along the (x) axis results in only horizontal (x) direction steering of the beam transmission axis 25 and movement of the laser source 15 along the (z) axis results in only vertical (y) direction steering of the beam transmission axis 25. When a change in position of the target involves displacement in both the vertical (y) direction and the horizontal (x) direction, as is the case for targets 26' and 26", the laser source 15 can be moved first along one axis and then along the other axis to obtain the resultant compound angular and/or compound directional steering required for the beam transmission axis 25 to be aimed at the tracked target. However, instead of sequential movement, the laser source 15 can be moved simultaneously along both axes. Steering of the beam transmission axis 25 by moving the laser source 15 or another optical component is advantageous because it requires a minimum number of moving mechanical parts and it allows the optical axis 17 to be shared with the optical system of the scope that is used to obtain an image of the target. As seen in FIG. 5 for example, with the incorporation of appropriate optical components, the incoming light or radiance 62 that passes through the lens 56 and beam splitter 54 can provide an image to the visualization device 50 of a scope 42, the image being of the distant area 58 at which the lens 56 is pointed. As shown by dotted line 71 in FIG. 5, the image may be directed to the scope 42 via the camera 64. As shown by dotted line 73 in FIG. 5, the scope 42 can be aligned with the optical system or path to receive the image directly via the incoming light 62. In each case, the image that can be seen with the visualization device can be the same as the image captured by the image capturing system. The scope 42 that is associated or integrated with the laser range finder 12 can include optics for daylight viewing and/or thermal optics for night viewing. The visualization device 50 can include a viewing eyepiece or lens and/or a digital video display.

Figure 7B:
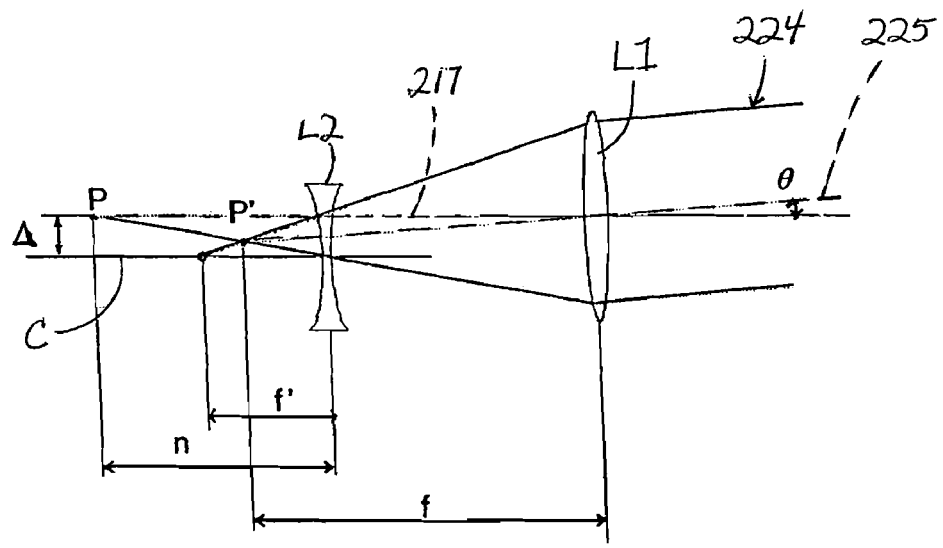
FIG. 7b is a diagram illustrating the concept of laser beam steering by decentering a lens.

The beam steering approach depicted in FIG. 7a may be less than optimal where the size and/or mass of the laser source makes movement thereof impractical due to the load that would be placed on the actuator, and where movement of the objective lens L1 is undesirable because it is a stationary component of the laser range finder and/or would place too great a load on the actuator. An alternative approach to beam steering that utilizes a secondary lens in the optical system or path is depicted in concept in FIG. 7b. In FIG. 7b, the laser source would be located at point P in alignment with the optical axis 217 of the objective lens L1, the axis 217 being the principal axis of the optical system. A concave lens L2 is positioned in the optical path between point P and the lens L1. The lens L2 is decentered from the axis 217 by a decentered distance Δ. The distance between the concave lens L2 and the objective lens L1 is selected so as to collimate the transmitted laser beam 224, which is possible by placing the virtual laser source P' on the focal plane of lens L1. For small decentering distances Δ, the steering angle θ of the beam transmission axis 225 can be derived from the following equation:

$$\theta = \frac{n}{n+f'} \cdot \frac{\Delta}{f}$$

where n is the objective distance of the laser source, i.e. point P, from the lens L2, f" is the focal length of lens L2 and f is the focal length of lens L1. With other parameters being fixed, the beam steering angle θ is therefore linearly proportional to the decentering distance Δ. In addition to the laser source and lenses, other components of the optical system, such as mirrors, may be moved in order to accomplish beam steering. Other approaches that may be employed in the beam steering system to steer or reconfigure the beam transmission axis, and therefore the transmitted laser beam, include acousto-optic systems, wedge prism systems, mirror piezoelectric tip/tilt platforms, LCSs, and MEMS scanning mirrors.

Figure 8:
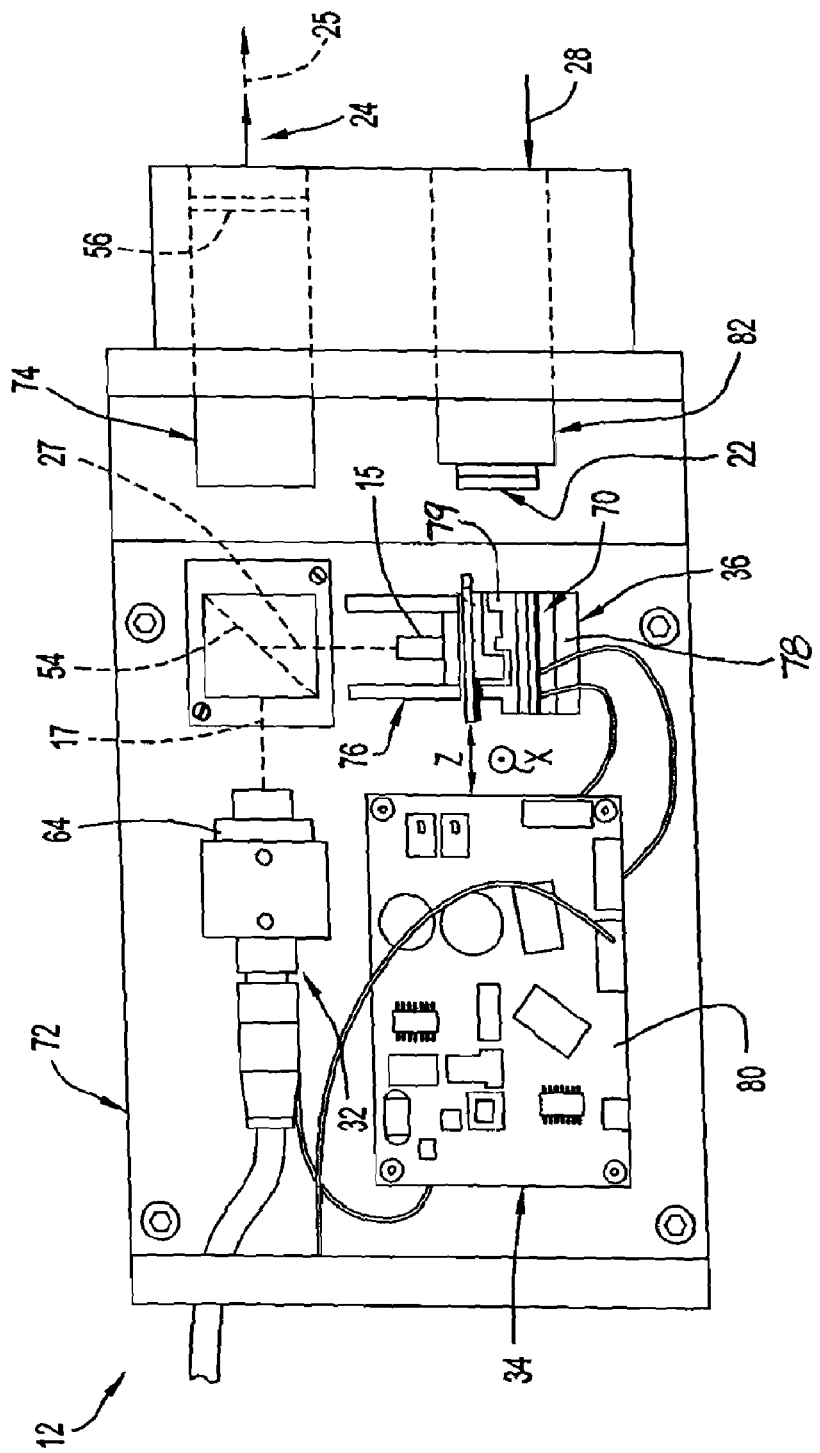
FIG. 8 is a plan view of the steerable laser range finder of FIG. 4 arranged in a housing.
Figure 9:
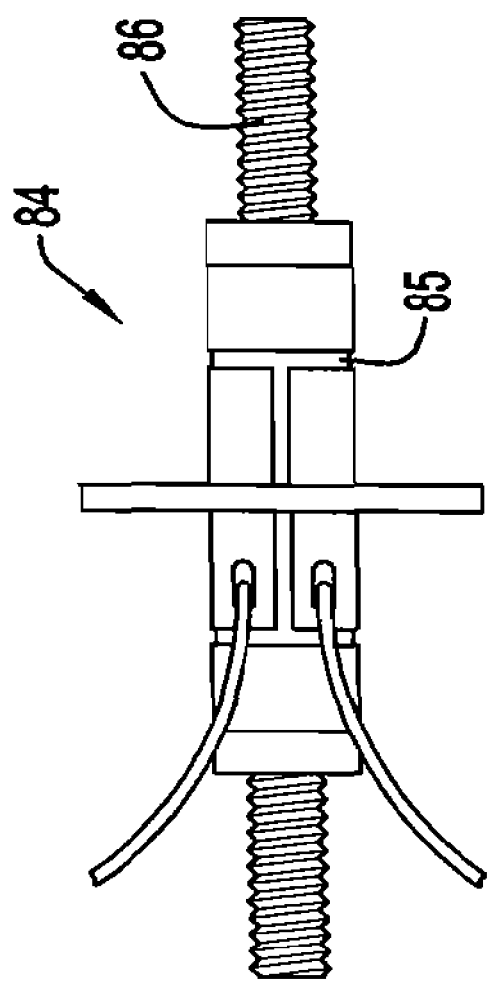
FIG. 9 is an enlarged side view of a motor for use in the beam steering system.

FIG. 8 is a plan view showing one possible arrangement of structural components of the steerable laser range finder 12 in the interior of an enclosure or housing 72, the walls of the enclosure 72 being only partially shown so as to expose its interior. The beam splitter 54, the objective lens 56 and the video camera 64 are arranged to be centered on the optical axis 17. The lens 56 is mounted within a transmission channel 74 of the transmission system, the transmission channel 74 having a forward end in line with the lens 56 that is pointed toward the target for which it is desired to acquire a range. The laser source 15 is mounted on a movable support frame 76 and moves as the support frame 76 is moved. The positioning mechanism 36 comprises the actuator 70 which is representative of a translational actuator including a stationary platform 78 secured to the enclosure 72, and a movable carriage 79 slidably mounted on the stationary platform 78 and attached to the support frame 76 of the laser source 15. The carriage 79 is movable relative to the stationary platform 78 in two directions along the (x) axis and in two directions along the (z) axis as shown by arrows, which correspondingly moves the laser source 15 to decenter the emission axis 27 from the center of the beam splitter 54. The actuator 70 further includes a pair of motors, one to effect movement of the carriage 79 along the (x) axis and the other to effect movement of the carriage 79 along the (z) axis. The motors are mounted in and/or on the platform 78 and are not visible in FIG. 8. A preferred type of motor for use in the actuator 70 is depicted in FIG. 9 and is described further below. Still referring to FIG. 8, the image processing system 34 includes one or more circuit boards 80 with appropriate microprocessor component(s), other electrical components, and electrical connections to the video camera 64 and to the motors of the translational actuator 70. The receiver optics are disposed within a receiver channel 82 of the receiver system, the receiver channel 82 being parallel to the transmission channel 74. The receiver channel 82 has a forward end arranged to receive the reflected laser beam 28 that is reflected from the target back to the range finder 12 during range acquisition. The range finding module 22 of the receiver system includes a light sensor disposed in line with the receiver channel 82 to receive the laser light that is reflected from the target back to the receiver system during range acquisition. The light sensor can be a photosensitive device (PSD) that is sensitive to the wavelength of the laser source. As is evident from the foregoing description and from FIGS. 1, 4 and 8 in particular, the reflected laser beam is reflected from the target back to the receiver system along a reflection path 28. The receiver system is not mechanically steered within the device. Consequently, the transmission path is steered angularly and directionally relative to the reflection path and the receiver system.

FIG. 9 depicts a motor 84 that is a preferred type of motor for use in the actuator 70. The motor 84, which is shown enlarged in size, is a piezoelectric micro motor of the type known as the SQUIGGLE motor sold by New Scale Technologies, Inc. The SQUIGGLE motor has several piezoelectric ceramic actuators attached to a threaded nut 85, and a mating threaded screw 86 within the threaded nut 85. The ceramic actuators create ultrasonic vibrations, causing the nut 85 to vibrate in an orbit. The rotating nut 85 turns the threaded screw 86, creating a smooth linear motion of the screw. The screw 86 can be driven to move linearly in two directions in accordance with the direction of rotation of the nut 85. Thread friction drives the screw 86, directly converting rotary motion of the nut 85 to linear motion of the screw 86. The speed and position of the threaded screw 86 can be precisely controlled, and the screw 86 holds its position when power to the ceramic actuators is terminated. The motor 84 is rugged, has very few moving parts, and can be designed very small in size, e.g. 1.8 mm by 1.8 mm by 6 mm. The motor 84 consumes power only when actuated. The small size of the motors and the minimal number of parts required in the actuator 70 allow the actuator 70 to be very small in size, i.e. 23 mm×22 mm×23 mm in a preferred embodiment. In the actuator 70, two motors 84 are provided: one to effectuate movement of the laser source 15 along the (x) axis and the other to effectuate movement of the laser source 15 along the (z) axis. The motors 84 can be arranged in the actuator 70 in various ways so that the linear motion of the threaded screws 86 of the motors is imparted to the movable carriage 79. Although the actuator 70 is depicted as a translational actuator, it should be appreciated that movement of the laser source and/or other optical component can be accomplished using translational or linear actuators, angular actuators and rotational actuators.

When the images being captured by the image capturing system 32 are visible spectrum or visible wavelength images acquired using a visible spectrum or visible wavelength video camera 64, target identification or detection can be based on motion of the target or, if the appearance of the target is known, template matching. Accordingly, moving objects may be considered potential or candidate targets, and target identification or detection performed by the image processing system 34 in one preferred embodiment of the target tracking system involves isolating regions of an image corresponding to moving objects, for example vehicles and humans, from the rest of the image. Isolating regions of an image corresponding to moving objects narrows the focus of attention for later processes, such as tracking and behavior analysis, performed by the image processing system because only the isolated regions need be considered in the later processes. The target tracking system 10 and method employ a "temporal difference" approach to target identification or detection where two consecutive or non-consecutive captured images or frames are subtracted from each other to obtain an image difference, followed by thresholding. Morphological operations may be applied to reduce the noise of the image difference. The "temporal difference" approach has the advantages of being adaptive to changes in dynamic environment, such as where the image background is dynamic due to camera shake, and in not making assumptions about the scenes portrayed in the images.

Figure 10:
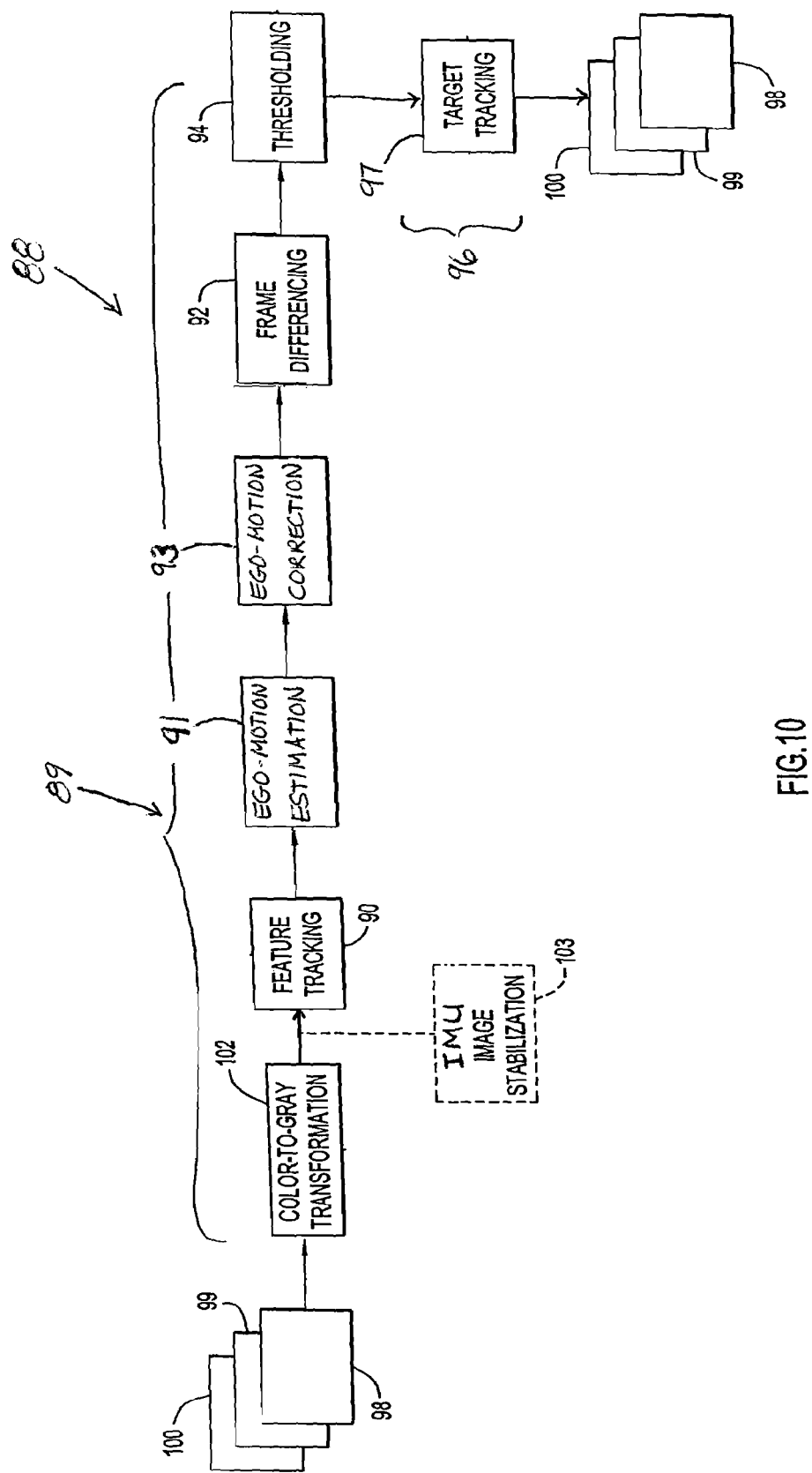
FIG. 10 is a block diagram illustrating the framework for an image processing algorithm employed in the automatic target tracking system.

One example of an image processing algorithm 88 based on the "temporal difference" approach that may be employed in the target tracking software 68 of the image processing system 34 is represented in FIG. 10, wherein the target identification aspect of the target tracking system and method is indicated at 89 and the target tracking aspect of the target tracking system and method is indicated at 96. The target identification aspect part of the algorithm 88 includes a color-to-gray transformation module 102, optional inertial measurement (IMU) image stabilization system 103, a feature tracking module 90, an ego-motion estimation module 91, an ego-motion correction module 93, a frame differencing module 92, and a thresholding module 94. A series of consecutive digital video images or frames, for example images 98, 99 and 100, acquired by the video camera 64 at consecutive time steps are transmitted to the color-to-gray transformation module 102. Image 98 is acquired at a first time step, image 99 is acquired after image 98 at a second time step consecutive to image 98, and image 100 is acquired after image 99 at a third time step consecutive to image 99. In the situation of tracking a moving target in the presence of camera shake, two independent types of motion, i.e. the motion of the target itself and the ego-motion of the camera 64, are reflected in the video images 98, 99 and 100. As discussed hereinabove, movement of the camera 64 typically results from extraneous movement that is imparted to the hand or hands of the operator being used to hold the range finder 12 and/or other structure, such as weapon 40, that may be associated with the range finder. Such movement may be referred to as camera shake or camera ego-motion. Before regions corresponding to motions of potential targets can be isolated in the images 98, 99 and 100, the images must be stabilized by eliminating or compensating for the ego-motion of the camera 64. To reduce processing time for subsequent modules, it is preferred that the images 98, 99, 100 initially be transformed into grayscale images. Accordingly, the color-to-gray transformation module 102 preferably first performs the step of color-to-gray transformation on the images 98, 99, 100 to obtain grayscale images. The step of color-to-gray transformation 102 involves transforming color information from the images 98, 99 and 100 into gray values. As an example of color-to-gray transformation, red (R), green (G) and blue (B) color information can be transformed into gray value through the formula: Gray=0.299R+0.587G+0.144B. In order to further speed up the processing time for subsequent modules, the inertial measurement (IMU) image stabilization system 103 can optionally be incorporated in the target tracking system 10 to replace, but more likely to supplement, the processes performed by the feature tracking module 90 as shown in FIG. 10 as well as in FIG. 1. The inertial measurement image stabilization system 103 can be made part of the image processing system 34. The inertial measurement image stabilization system employs an inertial measurement unit (IMU) which may be a gyroscopic unit. The grayscale images resulting from the color-to-gray transformation module 102, and optionally stabilized by the inertial measurement (IMU) image stabilization system 103 are processed by the feature tracking module 90. The feature tracking module 90 extracts hundreds of feature points found in the images 98, 99, 100, and tracks the feature points over the series of images 98, 99, 100. The feature points obtained from the feature tracking module 90 are used by the ego-motion estimation module 91 to calculate a camera ego-motion estimation or transformation which the ego-motion correction module 93 applies to the images 98, 99 and 100 to eliminate, correct or compensate for the camera ego-motion. Ego-motion correction involves properly aligning two consecutive images in order for the images to be subtracted from one another. After the camera motion estimation or transformation has been applied to the images 98, 99 and 100, the resulting images may be referred to as camera motion or ego-motion compensated images.

Feature tracking performed by the feature tracking module 90 for image stabilization may employ or be based on the algorithm known as the KLT (Kanade-Lucas-Tomasi) tracker. The KLT tracker algorithm selects or extracts features from images that are optimal for tracking, and keeps track of these features across a series of images. The KLT tracker algorithm is able to rank candidate features according to their strength and to select candidate features of greatest strength. The KLT tracker algorithm defines a measure of dissimilarity that quantifies the change in appearance of a feature between a current image and a preceding image, allowing for affine image changes. At the same time, a pure translation model of motion is used to track the selected best features over the series of images.

The frame differencing module 92 applies a frame differencing method to the ego-motion compensated images 98, 99 and 100 to detect all possible target motions. Frame differencing involves subtracting two properly aligned consecutive images from one another, resulting in an image that may be called an image difference. Subtraction of two consecutive images by frame differencing detects all possible motions of all potential targets, and the resulting "image difference" may, also be referred to as a "motion image". In the present example, images 98 and 99 would be subtracted from each other, and images 99 and 100 would be subtracted from each other. The image differences that result after application of frame differencing are operated on by the thresholding module 94. The thresholding module 94 subjects the image differences to a sequence of image processing steps including thresholding, morphological operations, and erosion to remove noise contained in the image differences. Optionally, the thresholding module 94 can perform Gaussian filtering on the image differences to further remove clustering noise.

After being subjected to the processes of the thresholding module 94, a target tracking algorithm is applied to the image differences by the target tracking module 96 to track one or more targets over time. The target tracking algorithm applied to the image differences may include particle filtering. Particle filtering is a known process involving the application of the particle filter to perform dynamic state estimation. The particle filter is essentially a sequential Monte Carlo algorithm, i.e. a sampling method for approximating a distribution that makes use of its temporal structure. The particle filter uses samples or "particles" to represent the posterior distribution of a dynamic state given a sequence of input measurements or observations about the state. As new input measurements or observations are acquired, the "particles" are constantly reallocated to update the estimation of the dynamic state. The input measurements or observations about the dynamic state used in the particle filter can be motion measurements or observations derived from the images, and the particle filter can incorporate a suitable motion model. The processes performed by the target tracking module 96 can be implemented using various known particle filters. Various additional functions can be included in the particle filter target tracking framework, for example functions to resolve occlusion and multiple target data association.

Figure 11:
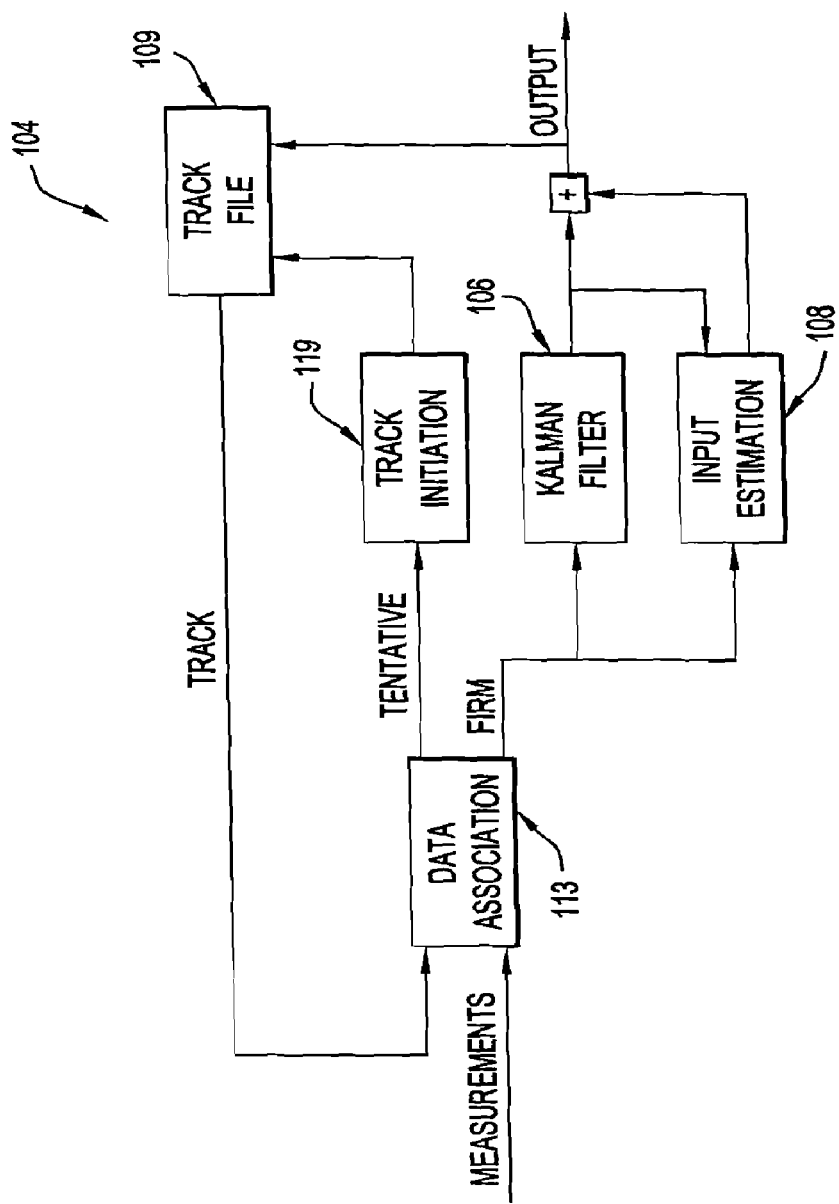
FIG. 11 is a block diagram illustrating a kinematic target tracking algorithm for use in the image processing algorithm.

For reasons of reliability and simplification, it may be preferable to replace the particle filter in the target tracking module 96 with a traditional kinematic target tracking algorithm based on Kalman filtering and nearest neighbor (NN) data association. A block diagram illustrating one example of a kinematic target tracking algorithm 104 for use in the target tracking module 96 is shown in FIG. 11.

The kinematic target tracking algorithm 104 employs a Kalman filter 106. The Kalman filter is essentially a set of mathematical equations that provides an efficient computational (recursive) means to estimate the state of a dynamic process, which can be executed in real time, in a way that minimizes the mean of the squared error. Being a recursive estimator, the Kalman filter requires only input measurements or observations for a current timestep and for an estimated state from a previous timestep in order to compute an estimated state for the current timestep. The Kalman filter exploits the dynamics of the target, which govern its time evolution, to reduce the effects of noise and obtain a reliable estimate of the location of the target at a current time step (filtering), at a future time step (prediction), or at a past time step (interpolation or smoothing).

The Kalman filter may be considered to have two distinct phases: predict and update. The predict phase uses an estimate of a state from a previous timestep to produce an estimate of the state at a current timestep. In the update phase, measurement information at the current timestep is used to refine the prediction to arrive at a new and more accurate estimate of the state for the current timestep. The equations for the Kalman filter may thusly include time update equations and measurement update equations. The time update equations are responsible for projecting forward in time the current state and error covariance estimates to obtain the predicted state estimate for the next timestep. The measurement update equations provide a form of feedback control by incorporating new measurements or observations into the predicted state estimate to obtain an improved current state estimate. In other words, the time update phase projects the current state estimate ahead in time and the measurement update phase adjusts the projected state estimate by an actual measurement at that time. After each time and measurement update pair, the process is repeated using previous state estimates to project or predict new current state estimates. Kalman filtering supports the estimation of past, present and future states of target motion. The Kalman filter attempts to provide the best prediction in the sense of minimum mean square error (MMSE) even when the nature of the target/motion is unknown, which is especially suitable for applications involving unknown targets and/or unpredictable motion. Furthermore, the Kalman filter demonstrates superior online learning capability. The filter continuously corrects/updates the coefficients of the Kalman filter with newly detected values to ensure the correctness of the predictions.

The system model for the Kalman filter 106 can be represented as:

$$\begin{cases} x_{k+1} = Ax_k + \omega_k \\ y_k = Cx_k + v_k \end{cases}$$

where x is the system state vector whose elements are target positions and velocities, y is the measurement vector, A is the state transition matrix, C is the measurement matrix, and $\omega$ and $v$ are zero-mean white system and measurement noises respectively.

For the kinematic target tracking algorithm 104, the state vector can be defined as:

$$x = [x \ \dot{x} \ y \ \dot{y}].$$

Supposing a constant velocity model is used in the kinematic target tracking algorithm 104, the state transition matrix A can be represented as:

$$A = \begin{bmatrix} 1 & \Delta T_k & 0 & 0 \\ 0 & 1 & 0 & 0 \\ 0 & 0 & 1 & \Delta T_k \\ 0 & 0 & 0 & 1 \end{bmatrix}.$$

The kinematic target tracking algorithm 104 can assume that between the $(k-1)^{th}$ and $k^{th}$ timestep the target undergoes a constant acceleration of $a_k$ that is normally distributed, with mean 0 and standard deviation $\sigma_a$. From Newton's laws of motion, it can then be concluded that $w_k = Ga_k$, where $$G = \begin{bmatrix} \frac{1}{2}\Delta T_k^2 & 0 \\ \Delta T_k & 0 \\ 0 & \frac{1}{2}\Delta T_k^2 \\ 0 & \Delta T_k \end{bmatrix}$$

and $$Q = cov(Ga) = E[(Ga)(Ga)^T] = GE[aa^T]G^T.$$

If the acceleration of each item in the state vector is assumed to be independent, then $$E = [a_x \cdot a_y] = O,$$

and $$E[aa^T] = \begin{bmatrix} \sigma_x^2 & 0 \\ 0 & \sigma_a^2 \end{bmatrix}.$$

Therefore, the state error covariance $Q = E[w_k w_k^T]$ is:

$$Q = \begin{bmatrix} \frac{1}{4}\Delta T_k^4 \sigma_x^2 & \frac{1}{2}\Delta T_k^3 \sigma_x^2 & 0 & 0 \\ \frac{1}{2}\Delta T_k^3 \sigma_x^2 & \Delta T_k^2 \sigma_x^2 & 0 & 0 \\ 0 & 0 & \frac{1}{4}\Delta T_k^4 \sigma_y^2 & \frac{1}{2}\Delta T_k^3 \sigma_y^2 \\ 0 & 0 & \frac{1}{2}\Delta T_k^3 \sigma_y^2 & \Delta T_k^2 \sigma_y^2 \end{bmatrix}.$$

For each potential target, the input measurements to the kinematic tracking algorithm 104 can include the actual location or position of the potential target as measured or detected by the frame differencing module 92 and represented as:

$$y_k = [x \ y].$$

Relating the state vector with the measurement vector is accomplished using an identity matrix as follows:

$$H = \begin{bmatrix} 1 & 0 & 0 & 0 \\ 0 & 0 & 1 & 0 \end{bmatrix}.$$

The filtering algorithm for the Kalman filter 106 can be represented as:

$$G_k = P_{k/k-1} C^H [CP_{k,k-1} C^H + R]^{-1}$$

$$\hat{x}_{k/k-1} = A\hat{x}_{k-1}$$

$$\alpha_k = y_k - C\hat{x}_{k/k-1}$$

$$\hat{x}_k = \hat{x}_{k/k-1} + G_k \alpha_k$$

$$P_k = P_{k/k-1} - G_k C P_{k/k-1}$$

$$P_{k+1/k} = A P_k A^H + Q$$

where R and Q are covariance matrices of measurement and system noises, respectively, $\alpha_k$ is the innovation vector representing the new information in the last measurement, and $G_k$ is the innovation gain matrix, which is determined by the noise covariance matrices.

The Kalman filter assumes zero-mean noise input, but this is usually not true for targets such as vehicles. Any kind of maneuvers, e.g. accelerating, decelerating, or turning, may be non-zero mean and should be regarded as input. The input estimation module 108 estimates maneuvers of the targets from the Kalman filtering error:

$$e_k = y_k - C\hat{x}_k$$

$$\bar{e}_k = \alpha \bar{e}_{k-1} + (1-\alpha) e_k$$

where $e_k$ is the Kalman filtering error, and $\bar{e}_k$ is the estimated input vector which is used to correct the Kalman filter output, the estimated input vector being a first order integrator.

The corrected Kalman filter output is saved in a track file 109 of the kinematic target tracking algorithm 104. As described further below, the track file 109 includes a list of tracks corresponding to targets currently being tracked by the system. Each track, or target being tracked, has a unique target identification (ID). Accordingly, "target identification (ID)" can be used synonymously with "track identification (ID)" to identify both a tracked target and the track for that target. The corrected Kalman filter output is saved in the track file 109 under the ID of the corresponding target/track. If a target/track has not been updated for a certain number of cycles of the kinematic target tracking algorithm 104, it is dropped out of the track file 109.

Where the images contain multiple targets, there may be multiple input measurements to the kinematic target tracking algorithm coming from different targets. A data association module 113 associates or correlates the input measurements with the correct targets. The data association module 113 employs Nearest Neighbor (NN) data association criteria to make the correct associations between input measurements and targets. The input measurements that are determined by the data association module 113 to be associated with currently tracked targets, i.e. targets designated FIRM, are transmitted to the Kalman filter 106. Input measurements that are determined by the data association module 113 to be associated with targets not being currently tracked, i.e. targets designated TENTATIVE, are transmitted to and processed by a track initiation module 119. The track initiation module 119 initiates new tracks for the "TENTATIVE" targets, and these new tracks are added to the track file 109.

Figure 12:
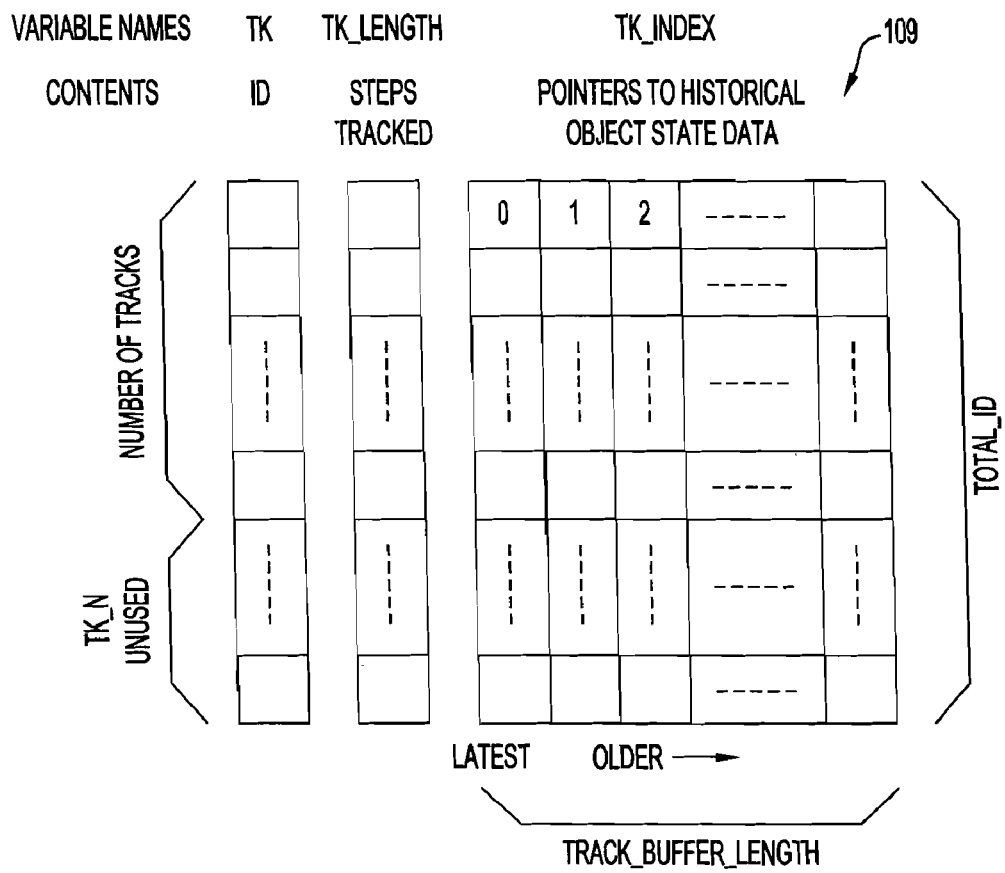
FIG. 12 illustrates the top-layer structure of a track file for use in the kinematic target tracking algorithm of FIG. 11.

One preferred structure for the track file 109 is illustrated in FIG. 12, which shows the top-layer structure of the track file 109 as comprising a linear list. Each entry of the list corresponds to a track (TK) and includes the track identification (ID), a count of the steps tracked for the target (TK_LENGTH), and a fixed length FIFO of most recent pointers to historical data for the track (TK INDEX). The track file 109 is a static structure, its size being defined by the constants TOTAL_ID and TRACK_BUFFER_LENGTH.

Figure 13:
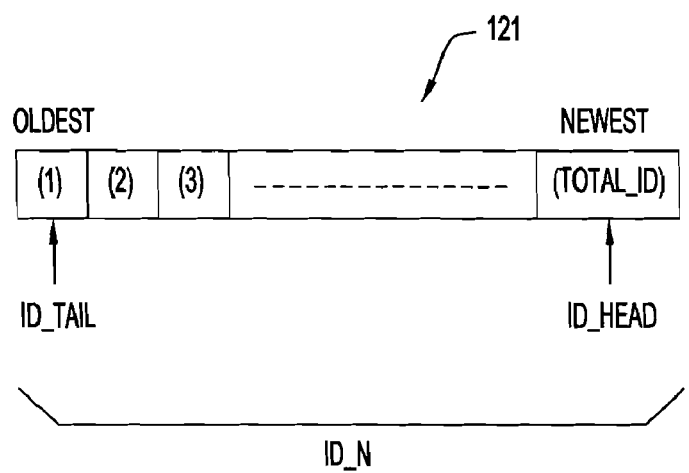
FIG. 13 depicts a queue structure of the track file.

FIG. 13 depicts a representative structure for a queue 121 of the track file 109 in which unused identifications (ID_N) are saved. Whenever a new track is initiated for a target, an unused identification is taken from the queue 121 and assigned to this track. The unused identification that is taken from the queue 121 for a new track is the current "oldest" identification (ID_TAIL) in the queue. Whenever a track is dropped by the algorithm 104, the identification for the dropped track is released and added to the queue 121, thus becoming the current "newest" identification (ID_HEAD) in the queue. The queue 121 is a static structure, its size being defined by the constant TOTAL_ID and pre-set with integers (1), (2), . . . up to TOTAL_ID.

Figures 14, 15:
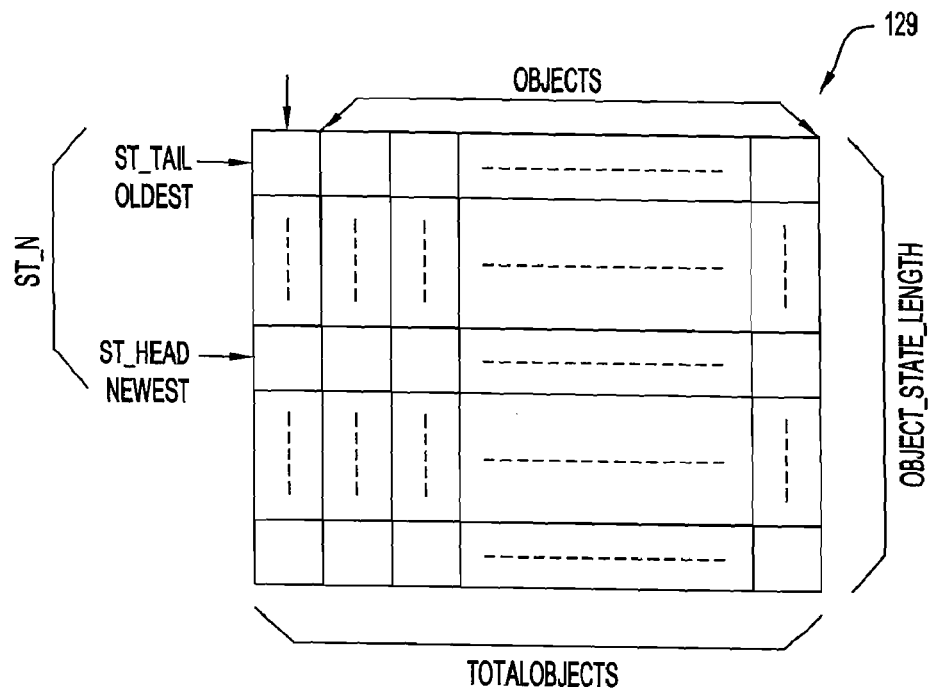
FIG. 14 illustrates an object state buffer structure of the track file.
FIG. 15 shows a distance matrix for use in a data association module of the kinematic target tracking algorithm of FIG. 11.

FIG. 14 depicts an object state buffer 129 for the historical object state data portion of the track file 109 of FIG. 12. The object state buffer 129 is a 2D array in which a first dimension thereof is implemented as a circular queue and the second dimension thereof is a fixed-length sub-array. The size of the object state buffer 129 is defined by two constants, i.e. OBJECT_STATE_LENGTH and TOTAL_OBJECTS. Each entry of the object state buffer 129 is an OBJECT_STATES structure, which may be represented as:

```
typedef struct {
    double stime;
    int state, ID;
    double m1,m2;
    double x,y;
    double vx,vy;
} OBJECT_STATES;
``` where "stime" is the time when the measurement or observation is received from the image sensor, "state" and "ID" are properties of the track, "m1" and "m2" are measurements or observations, and other terms are estimated states, i.e. smoothed states. Additional information, such as the time stamp of processing, may also be saved in the track file 109.

As mentioned hereinabove, when multiple targets are being tracked at the same time, it is necessary to correlate or associate input measurements or observations with the correct targets/tracks. In the kinematic tracking algorithm 104, this correlation or association is performed by the data association module 113 applying a known method of data association referred to as nearest neighbor (NN) data association. Although nearest neighbor (NN) data association may be preferred due to its simplicity, other classical data association methods can be employed in the data association module 113 including joint probability data association (JPDA), probability data association (PDA), and data association based on multi-hypothesis tracking (MHT).

The data association module 113 implements an association metric that is a measure of distances between input measurement-track pairs. The association metric satisfies the following criteria:

1.) Distinguishability: Given any two entities a and b, the distance between them must satisfy $$d(a,b) \geq 0$$

$$d(a,b) = 0 \Leftrightarrow a=b;$$

2.) Symmetry: Given any two entities a and b, the distance between them must satisfy $$d(a,b) = d(b,a);\text{ and}$$

3.) Triangle Inequality: Given any three entities a, b and c, the distances between them must satisfy $$d(a,b) + d(b,c) \geq d(a,c);$$

where the distance measure in 2D space (x,y) is defined as:

$$d(a,b) = |x_a - x_b| + |y_a - y_b|$$

with $(x_a, y_a)$ and $(x_b, y_b)$ being coordinates of entities a and b in 2D space.

The data association module 113 calculates the distances between all input measurement-track pairs, forming a distance matrix 113 as shown in FIG. 15 in which K is the total number of tracks and N is the total number of input measurements. The data association module 113 performs a gating process by which obviously impossible correlations between input measurement-track pairs are dropped or removed. The gating process involves evaluating each input measurement-track pair in relation to a predefined condition, such as distance. If the predefined condition is satisfied, such as the distance between each input measurement-track pair is larger than a predefined threshold distance, the input measurement is declared as not belonging to that track/target and it is removed. Subsequent to gating, the data association module 113 executes an assignment process by which retained input measurements are assigned to the associated tracks/targets. The logic applied in the assignment process may be represented as follows:

if $$d(k,n) = \min_{i=1 \ldots K} d(i,n) = \min_{j=1 \ldots N} d(k,j),$$

assign input measurement n to track k.

The approach to target tracking described above is based on motions of the targets/potential targets, and therefore the target tracking algorithms employ input measurements or observations that pertain to target/potential target motions. This approach is well suited for use where the image capturing system employs a visible spectrum or visible wavelength camera. Where the image capturing system employs a thermal camera, however, it is preferable that target tracking be based on temperature differences. Accordingly, the input measurements to the target tracking algorithm can be temperature measurements which are used to identify targets in the captured images processed by the processing system 34. It should be appreciated that the target tracking system can be programmed to search for and identify specific types of targets, e.g. humans and/or vehicles, in the captured images. Also, the target tracking system can be designed to perform different target tracking algorithms simultaneously. As explained further below, the target tracking algorithms are applied by the image processing system 34 to portions of the captured images within a predefined target tracking area. The target tracking area contains a predefined steering zone within which the beam transmission axis is steerable by the beam steering system 11.

Figure 16:
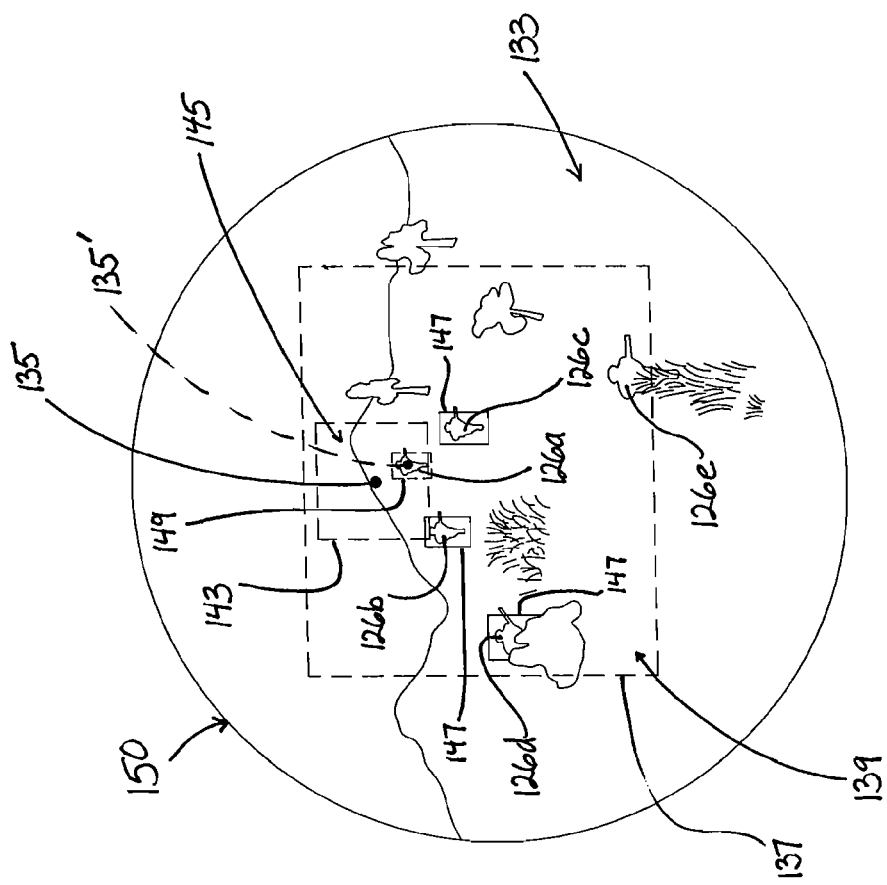
FIG. 16 is an example of an image of a distant area as seen via a visualization device of a scope during automatic target tracking and beam steering.

FIG. 16 is an example of an image 133 of a field of view that may be observed by an operator of the laser range finder 12 at a particular timestep via the visualization device 150 of the scope that is associated with the laser range finder. The image 133 is a magnified image of a distant area at which the forward end of the transmission channel of the range finder is pointed and which contains one or more remote targets. Assuming an image is captured by the image capturing system 32 at the same timestep, the captured image is the same as the image 133 that is visible via the visualization device. In this example, the image 133 is of a distant area containing a plurality of targets 126a, 126b, 126c, 126d and 126e, the targets 126a-126e being combat soldiers on foot. Therefore, any or all of the targets 126a-126e may be moving targets, and the targets may move individually in different directions and at different speeds. The image 133 also shows various background and/or foreground features including trees, mountains, bushes and grasses. The image that is seen with the visualization device 150 may change in real time, oftentimes quickly, as circumstances change in the area being visualized. In particular, the position of any one or more of the targets 126a-126e may change from moment to moment if the target moves and/or if the operator experiences extraneous motion. During automatic target tracking, a series of images of the distant area are captured in quick succession at consecutive timesteps such that positional changes of the target(s) in real time are reflected over the series of images. At any given timestep when an image of the distant area is captured by the image capturing system 32, the image seen with the visualization device 150 will be the same as the captured image.

The visualization device 150 can be designed to have a ranging reticle 135 superimposed over the image 133 which corresponds to the location of the beam transmission axis and, therefore, to the location where a range would be obtained if the range finder 12 was actuated to transmit the transmitted laser beam. The ranging reticle 135 can be a small size dot or other mark, such as a cruciform, that could be difficult to manually align with a selected one of the targets 126a-126e for which it is desired to acquire a range, especially if the selected target is in motion and/or if the operator of the range finder experiences extraneous movement. FIG. 16 shows the ranging reticle 135 in a nominal position. As described further below, the ranging reticle 135 can be a dynamic reticle that moves dynamically with steering of the beam transmission axis and with a target that has been locked by the system.

The visualization device 150 of the scope can be designed to have a peripheral target tracking border 137 superimposed over the image 133 that outlines or circumscribes a target tracking area 139. The target tracking area 139 corresponds to the predefined area in which automatic target tracking is performed, i.e. the area over which the target tracking algorithm operates to identify and follow targets, and the ranging reticle 135 is within the target tracking area 139. Accordingly, the portions of the captured images that correspond to or are within the target tracking area 139 are the image portions over which the target identification aspect and target tracking aspect of the target tracking algorithm will be applied during image processing as explained above. The target tracking border 137 is depicted by way of example as a box outlining or circumscribing the target tracking area 139. However, it should be appreciated that the target tracking border and target tracking area can have various peripheral configurations. In the example shown in FIG. 16, the targets 126a, 126b, 126c and 126d are each disposed entirely within the target tracking area 139 and, therefore, these targets will be tracked by the automatic target tracking system. The target tracking system can be designed to track only those targets that are disposed entirely within the target tracking area. Alternatively, the target tracking system can be designed to track targets that are partly disposed within the target tracking area, providing a sufficient part or portion of the target is disposed in the target tracking area. For example, the target 126e is disposed partly within the target tracking area 139, but not enough of the target 126e is disposed within the target tracking area 139 for it to be tracked by the target tracking algorithm. Targets disposed entirely outside of the target tracking area 139 will not be tracked by the target tracking algorithm.

The visualization device 150 of the scope can be designed to have a peripheral steering zone border 143 superimposed over the image 133 that outlines or circumscribes a steering zone 145 within the target tracking area 139. The steering zone 145 is a predetermined area disposed entirely within the target tracking area 139 and corresponding to the area over which the beam transmission axis 25 can be steered by the beam steering system 11. In order for the beam transmission axis to be automatically steered to and follow a target, the target must be disposed within the steering zone 145, as is the case for target 126a in FIG. 16. If more than one target is within the steering zone 145, the automatic target tracking system will select one of the targets within the steering zone and will control the beam steering system so that the beam transmission axis is steered to and will follow the selected target within the steering zone. The target tracking and beam steering systems can be designed so that the beam transmission axis is steered to a target only if it is disposed entirely within the steering zone. Alternatively, the target tracking and beam steering systems can be designed so that the beam transmission axis is steered to a target partly disposed in the steering zone, providing that a sufficient part or portion of the target is within the steering zone.

The visualization device 150 of the scope can be designed to display tracked target indicia 147 to identify targets currently being tracked by the target tracking system, and to display active tracked target indicia 149 to identify a tracked target that is "active", i.e. one disposed within the steering zone 145 and to which the beam steering axis will be or is being steered. The tracked target indicia 147 identifies a currently tracked target that is entirely or sufficiently within the target tracking area 139 to be tracked by the target tracking algorithm, but is not within or sufficiently with the steering zone 145 to have the beam transmission axis steered thereto. The tracked target indicia 147 may comprise a tracked target box in solid lines around the tracked target. As seen in FIG. 16, a tracked target indicia 147 in the form of a solid line tracked target box is displayed around each of the tracked targets 126b, 126c and 126d. The active tracked target indicia 149 for the active tracked target 126a is different from the indicia 147 and may comprise an active tracked target box in broken or dashed lines around the active tracked target 126a as seen in FIG. 16. It should be appreciated that various different indicia can be used to identify the tracked targets and the active tracked targets, including different colored indicia and/or indicia other than boxes. Because target tracking and beam steering are performed automatically it is not necessary that the target tracking border, the steering zone border, the tracked target indicia and/or the active tracked target indicia be visible to the operator or in the image displayed via the visualization device, although it is preferred that the ranging reticle and the active tracked target indicia 149 be visible.

As mentioned above, the ranging reticle 135 indicates the location of the beam transmission axis and, therefore, it indicates the location where a range will be obtained if the laser range finder is actuated. The ranging reticle 135 may be a dynamic reticle that moves correspondingly with the beam transmission axis as the beam transmission axis is steered by the beam steering system. When the ranging reticle 135 is within a pre-defined portion of the active tracked target box 149, the active tracked target 126a is locked and the laser range finder 12 is ready to acquire a range to the target 126a. If the position of the active tracked target 126a changes before a range is acquired, the ranging reticle 135 will move with the target 126a as the beam transmission axis is steered to follow the position of the target. FIG. 16 shows the ranging reticle 135' which represents the ranging reticle 135 moved from the nominal position to an adjusted position where the beam transmission axis is aimed at the target 126a. In using the laser range finder 12, the operator need only point the range finder so that an intended target is within the steering zone 145, whereupon the automatic target tracking system 10 automatically tracks the target within the steering zone and controls the beam steering system 11 so that the beam transmission axis is automatically steered to follow the target. It should be appreciated that the ranging reticle 135 could be a fixed ranging reticle that is fixed in the nominal position and that the reticle 135' can be provided as a separate adjusted ranging reticle that moves dynamically with the beam steering axis and/or the active tracked target. The dynamic reticle can be implemented in various ways including use of an electronic view finder device.

As pointed out above, the automatic target tracking and beam steering systems can be implemented in various devices and/or various practical applications other than range finding devices and/or range finding applications. Other devices and/or applications in which the automatic target tracking and beam steering systems can be implemented include laser designators, laser pointers, and laser illuminators. Still within the area of military defense, the automatic target tracking and beam steering systems can be used to aid in precision bombing of targets that pose potential threats to security. Devices incorporating the automatic target tracking and beam steering systems can be employed to not only find the accurate distance of a target from a particular location but also to track the target and enable elimination or neutralization of the target with the assistance of laser-guided bombs or laser-designated targeting. For example, the automatic target tracking and beam steering systems and methods can be employed in laser designators to stabilize the laser beam that is directed onto a target for detection by a laser-guided or "smart" bomb. Typically the laser beam is directed onto the target by an operator of the laser designator, and the laser signature of the reflected laser light from the target is detected by a detector carried by the bomb. The bomb will then follow a course that leads to the target from which the laser signature is detected. Because it is difficult for the operator to hold the laser beam steady on the target, laser designators must typically be mounted on a tripod to stabilize the laser beam. The automatic target tracking and beam steering systems and methods would be useful in laser designators to stabilize the laser beam while allowing the laser designator to be used as a hand-held device. In a different application, the automatic target tracking and beam steering systems and methods can be used to assist law enforcement in determining the speed of vehicles and to track vehicles determined to exceed the speed limit, even as the vehicles continue to move at high speed. The automatic target tracking and beam steering systems and methods can also be used in applications pertaining to satellite communication where lasers are directed toward satellites. The automatic target tracking and beam steering systems and methods would enable tracking of constantly orbiting satellites and accurately directing laser beams toward the satellites. In the area of calibration, the automatic target tracking and beam steering systems would allow laser range finders to be electronically calibrated to guns by automatically positioning the beam transmission axis where it needs to be in order for the transmitted laser beam to be parallel to the barrel of the gun.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. An automatic target tracking and beam steering system for automatically identifying and tracking a remote target and for automatically steering a laser beam to be aimed at the tracked target, comprising
   an image capturing system for capturing in real time a series of images containing the remote target;
   an image processing system for processing the series of images algorithmically to automatically identify the target in the images and to automatically track the position of the target across the series of images;
   an optical system including a plurality of optical components, one of said optical components being a laser source for emitting a laser beam;
   an actuator for moving an optical component of said optical system to angularly and directionally steer a transmission path that the laser beam will follow when emitted from said laser source, said actuator being controlled by said image processing system to move said optical component as needed so that the transmission path for the laser beam is steered to be aimed at the target tracked by said image processing system;
   a receiver system for receiving laser light that is reflected from the target along a reflection path to said receiver system when the laser beam is transmitted along the transmission path that has been steered to be aimed at the target; and
   a range finding module that works in combination with said optical system and said receiver system for calculating the range to the target;
   wherein the transmission path is angularly and directionally steered by said actuator relative to the reflection path, but there is no steering relative to and between the reflected laser light and said receiver system.

2. The automatic target tracking and beam steering system recited in claim 1 wherein said image capturing system includes a video camera.

3. The automatic target tracking and beam steering system recited in claim 2 wherein said video camera is a visible spectrum camera.

4. The automatic target tracking and beam steering system recited in claim 2 wherein said image processing system processes the series of images seeking to detect target motion.

5. The automatic target tracking and beam steering system recited in claim 4 wherein said image processing system processes the series of images by applying a particle filter.

6. The automatic target tracking and beam steering system recited in claim 4 wherein said image processing system processes the series of images by applying a kinematic tracking algorithm including a Kalman filter.

7. The automatic target tracking and beam steering system recited in claim 1 wherein said image processing system includes means for transforming the images into grayscale images.

8. The automatic target tracking and beam steering system recited in claim 2 wherein said image processing system includes means for processing the images to compensate for camera ego-motion.

9. The automatic target tracking and beam steering system recited in claim 1 wherein said image processing system tracks the target within a predetermined target tracking area within the images.

10. The automatic target tracking and beam steering system recited in claim 9 wherein said beam steering system steers the transmission path within a predetermined steering area within said target tracking area of the images.

11. The automatic target tracking and beam steering system recited in claim 1 wherein said laser source is the optical component of said optical system that is moved by said actuator.

12. The automatic target tracking and beam steering system recited in claim 1 wherein another of said optical components of said optical system is a lens, and said lens is the optical component of said optical system that is moved by said actuator.

13. The automatic target tracking and beam steering system recited in claim 1 wherein said automatic target tracking and beam steering system is incorporated in a laser range finder.

14. A steerable laser range finder, comprising
   a transmission system comprising a transmission optical system including an optical axis and a laser source for emitting a laser beam along an emission axis perpendicular to said optical axis, an image sensor along said optical axis for capturing a series of images in real time of an area containing a remote target, an actuator for moving said laser source in two directions along a first axis parallel with said optical axis and in two directions along a second axis perpendicular to said emission axis and said optical axis, said laser source having a nominal position wherein the laser beam emitted from said laser source is transmitted from said range finder along a beam transmission axis that is aligned with said optical axis, said laser source being movable by said actuator from said nominal position to steer said beam transmission axis angularly and directionally relative to said optical axis, and relative to an image sensor an image processing system for processing the images captured by said image sensor, said image processing system including means for processing the images algorithmically to automatically identify the target in the images and to track the position of the target across the images, said image processing system controlling said actuator to move said laser source as needed to steer said beam transmission axis to be aimed at the target being tracked by said image processing system so that the laser beam, when emitted from said laser source, is transmitted along said beam transmission axis that is aimed at the target; and
   a receiver system including said image sensor for receiving laser light that is reflected from the target back to said range finder when the transmitted laser beam is transmitted to the target, said receiver system including a range finding module for calculating the range to the target from said range finder, and said receiver system being non-steerable relative to and between the target and said image sensor.

15. The steerable laser range finder recited in claim 14 wherein said optical system includes a lens at a forward end of said transmission system that is directed toward the remote target, and a beam splitter centered on said optical axis, said emission axis being centered on said beam splitter in said nominal position of said laser source and being decentered from said beam splitter when said laser source is moved from said nominal position, said beam splitter being located between said lens and said image sensor.

16. The steerable laser range finder recited in claim 15 wherein said image sensor is incorporated in a video camera.

17. The steerable laser range finder recited in claim 15 and further including a scope with a visualization device providing an image of an area at which said forward end of said transmission system is directed.

18. The steerable laser range finder recited in claim 14 wherein said laser range finder is a hand-held portable device.

19. An automatic target tracking and beam steering method, comprising the steps of
- capturing a series of images of a remote target in real time via a camera incorporated in a miniaturized hand-held device;
- processing the series of images algorithmically via an image processing system of the device to automatically identify the target in the images and to automatically track the position of the target across the series of images;
- controlling an actuator of the device to move an optical component of the device, said step of controlling including controlling the actuator in response to said processing performed by the image processing system;
- steering a transmission path for a laser beam to be emitted from the device, said step of steering including steering the transmission path in response to the movement of the optical component so that the transmission path is aimed at the target being tracked by the image processing system;
- repeating said steps of capturing, processing, controlling and steering as needed so that the transmission path is continually steered to be aimed at the target being tracked by the image processing system;
- emitting a laser beam from the device whereupon the laser beam is emitted along the previously steered transmission path to the target; and
- receiving laser light that is reflected from the target along a reflection path to a receiver system of the device, said step of receiving including calculating the range to the target from the device;
- wherein said step of steering involves steering the transmission path angularly and directionally relative to the reflection path, and wherein said step of receiving is accomplished without steering the reflected laser light or means by which the reflected light is received.

* * * * *